United States Patent
Motomura et al.

(10) Patent No.: US 9,418,414 B2
(45) Date of Patent: Aug. 16, 2016

(54) IMAGE MEASUREMENT APPARATUS, IMAGE MEASUREMENT METHOD AND IMAGE MEASUREMENT SYSTEM

(71) Applicant: Panasonic Corporation, Osaka (JP)

(72) Inventors: Hideto Motomura, Kyoto (JP); Yoshikuni Sato, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 145 days.

(21) Appl. No.: 14/132,837

(22) Filed: Dec. 18, 2013

(65) Prior Publication Data

US 2014/0105480 A1    Apr. 17, 2014

Related U.S. Application Data

(63) Continuation of application No. PCT/JP2013/002994, filed on May 9, 2013.

(30) Foreign Application Priority Data

May 30, 2012 (JP) .................. 2012-123644

(51) Int. Cl.
- G06K 9/00 (2006.01)
- G06T 7/00 (2006.01)

(Continued)

(52) U.S. Cl.
CPC .......... G06T 7/0012 (2013.01); G06K 9/0014 (2013.01); G06K 9/00134 (2013.01);
(Continued)

(58) Field of Classification Search
None
See application file for complete search history.

(56) References Cited

U.S. PATENT DOCUMENTS

| 4,045,655 A * | 8/1977 | Suzuki ............ G06T 7/60 377/10 |
| 5,539,517 A | 7/1996 | Cabib et al. |

(Continued)

FOREIGN PATENT DOCUMENTS

| JP | 7-198714 | 8/1995 |
| JP | 2001-525580 | 12/2001 |

(Continued)

OTHER PUBLICATIONS

International Search Report issued Jul. 2, 2013 in corresponding International Application No. PCT/JP2013/002994.

(Continued)

Primary Examiner — Stephen R Koziol
Assistant Examiner — Sean Conner
(74) Attorney, Agent, or Firm — Wenderoth, Lind & Ponack, L.L.P.

(57) ABSTRACT

An image measurement apparatus includes: an image acquiring unit that acquires a sample image that is an image obtained by capturing an image of a sample; a standard color space converting unit that converts the sample image into a standard sample image that is an image in a standard color space; a color distribution normalizing unit that converts the standard sample image into a normalized sample image by converting pixel values of pixels in the standard sample image to cause a color distribution vector indicating a color distribution of the standard sample image to match a predetermined standard color distribution vector indicating a standard color distribution; and a positive rate acquiring unit that detects positive pixels by performing threshold processing on pixel values of pixels in the normalized sample image, and acquires a positive rate indicating a proportion of the detected positive pixels.

14 Claims, 27 Drawing Sheets

(51) Int. Cl.
  *G06T 7/40* (2006.01)
  *G06T 11/00* (2006.01)
(52) U.S. Cl.
  CPC .............. *G06T7/0081* (2013.01); *G06T 7/408* (2013.01); *G06T 11/001* (2013.01); *G06T 2207/10024* (2013.01); *G06T 2207/10056* (2013.01); *G06T 2207/20148* (2013.01); *G06T 2207/30024* (2013.01); *G06T 2207/30242* (2013.01)

(56) References Cited

U.S. PATENT DOCUMENTS

| | | | |
|---|---|---|---|
| 5,719,024 A | 2/1998 | Cabib et al. | |
| 5,784,162 A | 7/1998 | Cabib et al. | |
| 5,798,262 A | 8/1998 | Garini et al. | |
| 5,817,462 A | 10/1998 | Garini et al. | |
| 5,835,214 A | 11/1998 | Cabib et al. | |
| 5,856,871 A | 1/1999 | Cabib et al. | |
| 5,871,932 A | 2/1999 | Bar-Am et al. | |
| 5,906,919 A | 5/1999 | Garini et al. | |
| 5,912,165 A | 6/1999 | Cabib et al. | |
| 5,936,731 A | 8/1999 | Cabib et al. | |
| 5,991,028 A | 11/1999 | Cabib et al. | |
| 5,995,645 A | 11/1999 | Soenksen et al. | |
| 6,007,996 A | 12/1999 | McNamara et al. | |
| 6,018,587 A | 1/2000 | Cabib | |
| 6,026,174 A * | 2/2000 | Palcic | G01N 1/30 382/128 |
| 6,043,039 A | 3/2000 | Bar-Am et al. | |
| 6,055,325 A | 4/2000 | Garini et al. | |
| 6,066,459 A | 5/2000 | Garini et al. | |
| 6,075,599 A | 6/2000 | Milman et al. | |
| 6,091,842 A * | 7/2000 | Domanik | G01N 15/1468 250/201.3 |
| 6,165,734 A | 12/2000 | Garini et al. | |
| 6,198,532 B1 | 3/2001 | Cabib et al. | |
| 6,276,798 B1 | 8/2001 | Gil et al. | |
| 6,419,361 B2 | 7/2002 | Cabib et al. | |
| 6,556,853 B1 | 4/2003 | Cabib et al. | |
| 6,690,817 B1 | 2/2004 | Cabib et al. | |
| 7,079,675 B2 | 7/2006 | Hamer et al. | |
| 7,200,252 B2 | 4/2007 | Douglass | |
| 7,292,718 B2 | 11/2007 | Douglass | |
| 8,341,100 B2 | 12/2012 | Miller et al. | |
| 2001/0033364 A1 | 10/2001 | Cabib et al. | |
| 2003/0035156 A1* | 2/2003 | Cooper | H04N 1/6077 358/516 |
| 2003/0165263 A1 | 9/2003 | Hamer et al. | |
| 2004/0081345 A1 | 4/2004 | Douglass | |
| 2004/0233218 A1* | 11/2004 | Shin | H04N 1/6058 345/603 |
| 2004/0239971 A1* | 12/2004 | Kim | H04N 1/6058 358/1.9 |
| 2005/0276457 A1 | 12/2005 | Hamer et al. | |
| 2007/0041627 A1 | 2/2007 | Douglass | |
| 2007/0242162 A1* | 10/2007 | Gutta | G06T 7/408 348/645 |
| 2008/0279467 A1* | 11/2008 | Liu | G06K 9/00234 382/254 |
| 2009/0046171 A1* | 2/2009 | Kogan | H04N 1/6033 348/223.1 |
| 2009/0141975 A1* | 6/2009 | Li | H04N 1/6077 382/167 |
| 2010/0004915 A1 | 1/2010 | Miller et al. | |
| 2010/0254589 A1* | 10/2010 | Gallagher | G06K 9/0014 382/133 |
| 2010/0329535 A1* | 12/2010 | Macenko | G06K 9/0014 382/133 |
| 2011/0038523 A1* | 2/2011 | Boardman | G06T 7/0012 382/133 |
| 2012/0327211 A1 | 12/2012 | Yamamoto | |
| 2013/0011036 A1 | 1/2013 | Marugame et al. | |
| 2013/0094733 A1 | 4/2013 | Nosato et al. | |

FOREIGN PATENT DOCUMENTS

| | | | |
|---|---|---|---|
| JP | 2003-116593 | 4/2003 | |
| JP | 2004-151101 | 5/2004 | |
| JP | 4071186 | 4/2008 | |
| JP | 2010-60564 | 3/2010 | |
| JP | 2010-156612 | 7/2010 | |
| JP | 2011-181015 | 9/2011 | |
| JP | 2011-210156 | 10/2011 | |
| JP | 2011-527178 | 10/2011 | |
| WO | 96/03615 | 2/1996 | |
| WO | 97/21979 | 6/1997 | |
| WO | 97/22848 | 6/1997 | |
| WO | 97/40191 | 10/1997 | |
| WO | 98/13525 | 4/1998 | |
| WO | 98/43042 | 10/1998 | |
| WO | 98/44314 | 10/1998 | |
| WO | 98/48050 | 10/1998 | |
| WO | 99/01843 A1 | 1/1999 | |
| WO | 99/01843 A9 | 1/1999 | |
| WO | 99/16353 | 4/1999 | |
| WO | 99/28856 | 6/1999 | |
| WO | 00/06773 | 2/2000 | |
| WO | 00/06774 | 2/2000 | |
| WO | 00/17808 | 3/2000 | |
| WO | 00/31534 | 6/2000 | |
| WO | 00/67635 | 11/2000 | |
| WO | 2004/074767 | 9/2004 | |
| WO | 2010/003044 A2 | 1/2010 | |
| WO | 2010/003044 A3 | 1/2010 | |
| WO | WO 2011121900 A1 * | 10/2011 | ............ H04N 1/4072 |
| WO | 2012/011579 | 1/2012 | |

OTHER PUBLICATIONS

HER2 Test Guide, Third Edition, Sep. 2009, p. 9.

* cited by examiner

| Test information | Object of interest | Threshold value | | | | | | |
|---|---|---|---|---|---|---|---|---|
| | | L* | | a* | | b* | | |
| | | Lower limit | Upper limit | Lower limit | Upper limit | Lower limit | Upper limit | |
| Hematoxylin-eosin staining | Positive | 18 | 33 | 23 | 48 | 6 | 19 | |
| | Negative | 42 | 65 | -68 | 7 | -85 | -20 | |
| | Positive 1 | 27 | 54 | -11 | 24 | -71 | -39 | |
| | Positive 2 | 35 | 66 | -52 | -8 | -63 | -27 | |
| Alcian blue staining | Negative | 38 | 59 | 15 | 60 | -8 | 14 | |
| .. | .. | .. | | | | | | |

FIG. 21

| Number | Input (color information) | | | Output (digital signal) | | |
|---|---|---|---|---|---|---|
| | X | Y | Z | R | G | B |
| 1 | 0.02 | 0.01 | 0.02 | 1 | 1 | 2 |
| 2 | 0.22 | 0.20 | 0.21 | 5 | 4 | 4 |
| ⋮ | ⋮ | ⋮ | ⋮ | ⋮ | ⋮ | ⋮ |
| 29 | 99.7 | 100.8 | 106.6 | 254 | 254 | 254 |
| 30 | 0.07 | 0.03 | 0.02 | 5 | 1 | 1 |
| 31 | 0.21 | 0.10 | 0.09 | 11 | 2 | 1 |
| ⋮ | ⋮ | ⋮ | ⋮ | ⋮ | ⋮ | ⋮ |
| 59 | 70.22 | 20.51 | 5.72 | 254 | 3 | 2 |
| 60 | 0.03 | 0.03 | 0.14 | 1 | 6 | 1 |
| 61 | 0.10 | 0.23 | 0.11 | 1 | 12 | 2 |
| ⋮ | ⋮ | ⋮ | ⋮ | ⋮ | ⋮ | ⋮ |
| 89 | 5.21 | 71.50 | 9.82 | 2 | 253 | 3 |
| 90 | 0.02 | 0.02 | 0.10 | 1 | 1 | 6 |
| 91 | 0.03 | 0.08 | 0.24 | 1 | 1 | 13 |
| ⋮ | ⋮ | ⋮ | ⋮ | ⋮ | ⋮ | ⋮ |
| 119 | 0.10 | 9.70 | 0.33 | 2 | 2 | 254 |

IMAGE MEASUREMENT APPARATUS, IMAGE MEASUREMENT METHOD AND IMAGE MEASUREMENT SYSTEM

CROSS REFERENCE TO RELATED APPLICATION

This is a continuation application of PCT Patent Application No. PCT/JP2013/002994 filed on May 9, 2013, designating the United States of America, which is based on and claims priority of Japanese Patent Application No. 2012-123644 filed on May 30, 2012. The entire disclosures of the above-identified applications, including the specifications, drawings and claims are incorporated herein by reference in their entirety.

FIELD

One or more exemplary embodiments disclosed herein relate generally to an image measurement apparatus, an image measurement method and an image measurement system that measure an image of a sample prepared from a specimen.

BACKGROUND

Medical practice is roughly divided into two areas: diagnostics service and treatment service.

The diagnostics service has an objective of obtaining the name and state of a disease, and thus a treatment regimen is determined according to the disease name and the disease state. In order to determine the disease name or the disease state, pathological diagnostics is performed by taking a specimen from a lesion and observing the state on a cellular level. In the pathological diagnostics, the obtained specimen is sliced to a thickness that can be observed with a microscope to give a sample. The sample is captured with a digital camera or a scanner through the microscope, and the resulting digital image is stored and referenced.

Digitization of diagnostic images as described above has brought increased consistency with computerized data processing, and thus has provided more opportunities to assist physicians and technicians with their diagnostics service by using IT systems. CAD (Computer Aided Detection) is an example of such digitalization, and is a method of utilizing a computer in detection of a lesion.

However, when scanners or cameras for capturing images of samples have different input characteristics, a plurality of different sample images are produced from a single sample. The pathological diagnostics is performed by observing a stained sample, and thus differences in color affect the diagnostic results. For example, in the method disclosed in Patent Literature (PTL) 1, situations arise in which the pixels defining an object of interest, the pixels defining a normal cell, and the pixels defining the background area of a biological specimen image vary depending on the scanners or the cameras. Accordingly, it is not possible to uniquely determine threshold values for identifying the object of interest, the normal cell and the background, and thus it is necessary to set threshold values for each scanner or camera. However, setting threshold values in each scanner or camera is inefficient in terms of maintenance of the image measurement apparatus.

Under the circumstances described above, PTL 2 discloses a technique for performing accurate pathological diagnostics by correcting differences in the input characteristics of scanners or cameras for capturing images of samples.

CITATION LIST

Patent Literature

[PTL 1] Japanese Patent No. 4071186
[PTL 2] Japanese Unexamined Patent Application Publication No. 2011-210156

SUMMARY

However, the conventional techniques described above are susceptible to color variations due to sample preparation, and thus are problematic in that it is not possible to identify an object of interest by using a fixed threshold value.

The present disclosure has been made to solve the problems encountered with conventional technology, and one non-limiting and exemplary embodiment provides an image measurement apparatus, an image measurement method and an image measurement system that can identify a specific object of interest by using a fixed threshold value without being affected by the color variations due to sample preparation.

In one general aspect, the techniques disclosed here feature an image measurement apparatus including: an image acquiring unit configured to acquire a sample image that is an image obtained by capturing an image of a sample; a standard color space converting unit configured to convert the sample image into a standard sample image that is an image in a standard color space; a color distribution normalizing unit configured to convert the standard sample image into a normalized sample image by converting pixel values of pixels in the standard sample image to cause a color distribution vector indicating a color distribution of the standard sample image to match a predetermined standard color distribution vector indicating a standard color distribution; and a positive rate acquiring unit configured to detect positive pixels by performing threshold processing on pixel values of pixels in the normalized sample image, and acquire a positive rate indicating a proportion of the detected positive pixels.

These general and specific aspects may be implemented using a system, a method, an integrated circuit, a computer program, or a computer-readable recording medium such as a CD-ROM, or any combination of systems, methods, integrated circuits, computer programs, or recording media.

According to one or more exemplary embodiments or features disclosed herein, it is possible to identify a specific object of interest by using a fixed threshold value without being affected by the color variations due to sample preparation.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 19 is a diagram showing an example of a method for calculating a matrix a.

FIG. 21 is a diagram illustrating an example of input/output characteristics of an image acquiring unit.

DETAILED DESCRIPTION

Underlying Knowledge Forming Basis of the Present Disclosure

In relation to PTL 2 disclosed in the Background Art section, the inventors have found the following problem.

Figure 25:
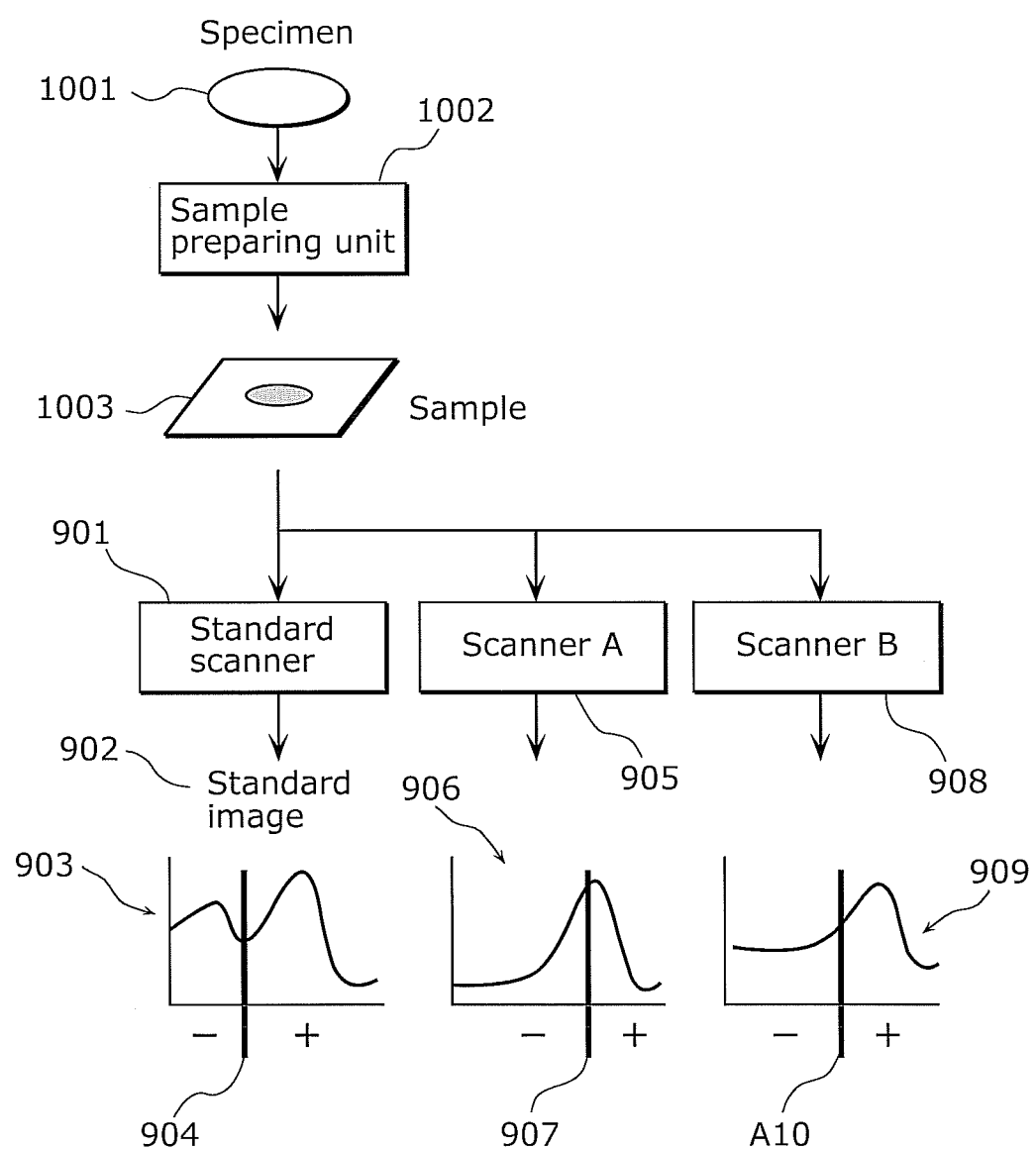
FIG. 25 is a diagram illustrating differences in characteristics of scanners that serve as examples of image input apparatuses according to PTL 2.

As shown in FIG. 25, a standard scanner 901 is determined, and a sample image captured with the standard scanner 901 is defined as a standard image 902. A positive nucleus and a negative nucleus (normal cell nucleus) are determined from the standard image 902, and a threshold value for identifying these two is set. In FIG. 25, a threshold value 904 is set in a pixel value histogram 903 according to PTL 2. In other words, if the pixel value of a test image is greater than the threshold value 904, it is determined as positive, and if the pixel value of the test image is smaller than the threshold value 904, it is determined as negative. In the pixel value histogram 903, the horizontal axis indicates pixel value, and the vertical axis indicates frequency. The same applies to pixel value histograms 906 and 909, which will be described later.

Meanwhile, when a scanner other than the standard scanner 901 is used, because it has different input characteristics, a pixel value histogram that is different from the pixel value histogram 903 is obtained. A scanner A 905 has input characteristics that are different from those of the standard scanner 901, and thus a pixel value histogram 906 that is different from the pixel value histogram 903 is obtained. Accordingly, a threshold value 907 for identifying a positive nucleus or a negative nucleus is also different from the threshold value 904. The same applies to a scanner B 908. A pixel value histogram 909 is different from the pixel value histogram 903, and a threshold value A 10 is different from the threshold value 904.

To address this, according to PTL 2, histogram transformation is performed to absorb the differences in input characteristics.

Figure 26:
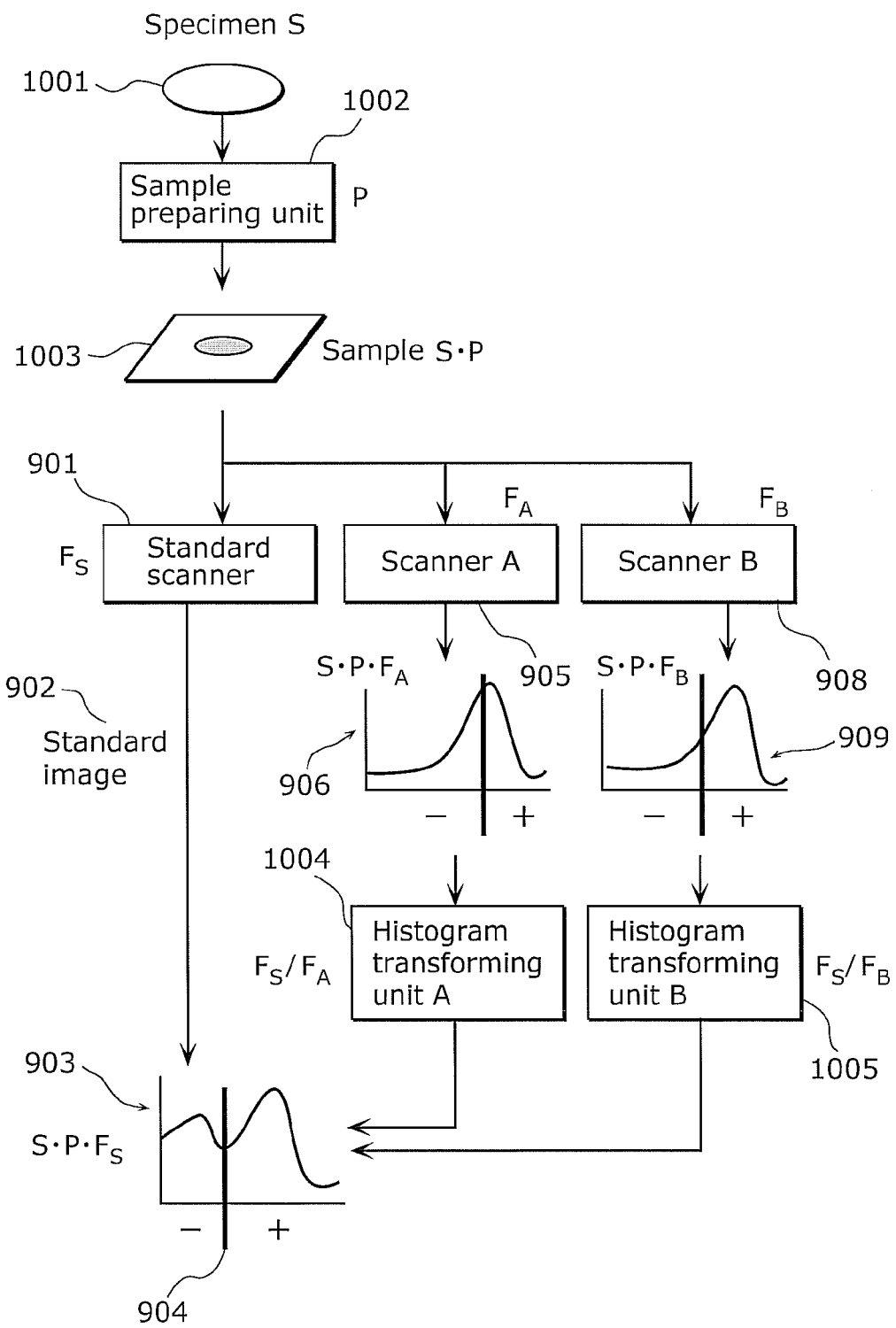
FIG. 26 is a diagram illustrating a method for correcting the differences in characteristics of scanners through histogram transformation according to PTL 2.

As shown in FIG. 26, if it is assumed that a sample 1003 having characteristics S·P is prepared from a specimen 1001 having characteristics S by a sample preparing unit 1002 having characteristics P, and the standard scanner 901 has input/output characteristics $F_s$, then, the pixel value histogram 903 will have characteristics S·P·$F_s$.

Meanwhile, the scanner A 905 has input/output characteristics $F_A$ that are different from those of the standard scanner 901, and thus the characteristics of the pixel value histogram 906 of the sample image captured with the scanner A 905 can be represented by S·P·$F_A$. A histogram transforming unit A 1004 applies $F_s/F_A$ to the pixel value histogram 906 in order to match the pixel value histogram 906 to the pixel value histogram 903. Likewise, the scanner B 908 has input/output characteristics $F_B$ that are different from those of the standard scanner 901, and thus the characteristics of the pixel value histogram 909 of the sample image captured with the scanner B 908 can be represented by S·P·$F_B$. A histogram transforming unit B 1005 applies $F_s/F_B$ to the pixel value histogram 909 in order to match the pixel value histogram 909 to the pixel value histogram 903.

Through the above processing, even when image input apparatuses such as scanners or digital cameras have different input characteristics, by causing the color information of captured images to match the color information of the standard image, the positive nucleus, the negative nucleus and the background can be separated by a set of threshold values.

Figure 27:
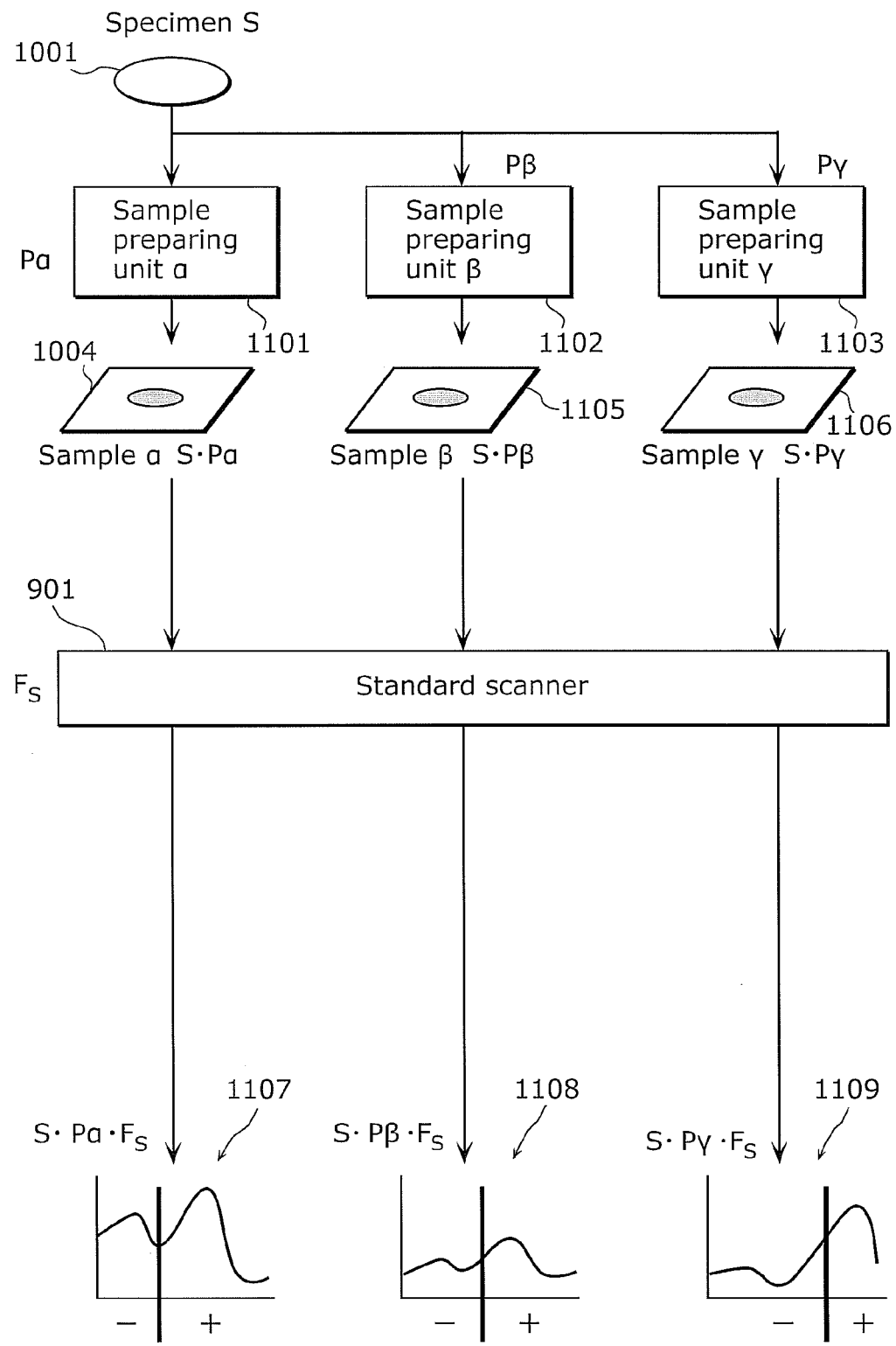
FIG. 27 is a diagram illustrating the fact that differences in characteristics of the sample preparing units of PTL 2 cause color variations in the resulting sample images.

The method disclosed in PTL 2, however, cannot cope with color variations due to sample preparation. Specifically, as shown in FIG. 27, in the case where a sample preparing unit α 1101 has characteristics Pα, a sample preparing unit β 1102 has characteristics Pβ, and a sample preparing unit γ 1103 has characteristics Pγ, a sample α 1104 will have characteristics S·Pa, a sample β 1105 will have characteristics S·Pβ, and a sample γ 1106 will have characteristics S·Pγ. As can be seen from this, even when the samples are obtained from the same specimen S, the samples do not have the same colors. Accordingly, even if the sample α 1104, the sample β 1105 and the sample γ 1106 are captured with the standard scanner 901 in the same manner, the resulting pixel value histograms will be different. Specifically, a pixel value histogram 1107 will have characteristics S·pα·$F_s$, a pixel value histogram 1108 will have characteristics S·Pβ·$F_s$, and a pixel value histogram 1109 will have characteristics S·Pγ·$F_s$.

As described above, even when sample images are captured with the standard scanner 901, color variations due to sample preparation cannot be absorbed, and thus it is necessary to individually set a threshold value for identifying a positive nucleus and a negative nucleus.

In view of the above, in the present disclosure, an image measurement apparatus, an image measurement method and an image measurement system that can identify a specific object of interest such as a positive nucleus or a negative nucleus by using a fixed threshold value while absorbing color differences in sample images caused due to differences in sample preparation will be described.

According to an exemplary embodiment disclosed herein, an image measurement apparatus includes: an image acquiring unit configured to acquire a sample image that is an image obtained by capturing an image of a sample; a standard color space converting unit configured to convert the sample image into a standard sample image that is an image in a standard color space; a color distribution normalizing unit configured to convert the standard sample image into a normalized sample image by converting pixel values of pixels in the standard sample image to cause a color distribution vector indicating a color distribution of the standard sample image to match a predetermined standard color distribution vector indicating a standard color distribution; and a positive rate acquiring unit configured to detect positive pixels by performing threshold processing on pixel values of pixels in the normalized sample image, and acquire a positive rate indicating a proportion of the detected positive pixels.

According to this configuration, a sample image is converted into a standard sample image in a standard color space. It is thereby possible to convert the sample image into an image having common color information that is not dependent on the characteristics of the image acquiring unit. Also, the color distribution normalizing unit converts the pixel value of each pixel in the standard sample image such that the color distribution vector of the standard sample image matches the standard color distribution vector. Accordingly, the variations in color distribution of the samples can be absorbed, and a normalized sample image that is not dependent on the sample preparation method can be produced. By acquiring a positive rate from the normalized sample image, it is possible to acquire the positive rate that is not dependent on the characteristics of the image acquiring unit and is not dependent on the differences in sample preparation. In other words, it is possible to identify a specific object of interest by using fixed threshold values without being affected by the color variations due to sample preparation.

To be specific, the color distribution normalizing unit may be configured to convert the standard sample image into the normalized sample image by converting the pixel values of the pixels in the standard sample image to cause a standard sample color distribution vector to match the standard color distribution vector, the standard sample color distribution vector representing the color distribution vector and being a vector indicating a color frequency distribution in the standard color space of the plurality of pixels included in the standard sample image, and the standard color distribution vector representing the standard color distribution and indicating a standard color frequency distribution.

The color distribution normalizing unit converts the pixel value of each pixel in the standard sample image such that the sample color distribution vector matches the standard color distribution vector. Accordingly, the variations in color distribution of the samples can be absorbed, and a normalized sample image that is not dependent on the sample preparation method can be produced.

Also, the standard color distribution vector may be a mean vector of vectors representing the color frequency distribution that are obtained from each of a plurality of reference standard sample images, the plurality of reference standard sample images being images in the standard color space of the plurality of reference sample images obtained by capturing images of a plurality of samples prepared from the same reference specimen by using a plurality of sample preparation methods having different characteristics.

According to this configuration, a vector indicating the distribution of color intensity is obtained from each of a plurality of reference standard sample images having different characteristics in the sample preparation method, and the mean vector of the obtained vectors is defined as the standard color distribution vector. Accordingly, the standard color distribution vector can represent a standard color distribution.

Also, the color distribution normalizing unit may be configured to convert the standard sample image into the normalized sample image by converting the pixel values of the pixels in the standard sample image to cause the color distribution vector to match the standard color distribution vector, the color distribution vector being a mean vector of vectors indicating a color in the standard color space of each pixel included in the standard sample image, and the standard color distribution vector indicating the standard color distribution in the standard color space.

The color distribution normalizing unit converts the pixel value of each pixel in the standard sample image such that the mean vector of the vectors indicating the color in the standard color space of each pixel included in the standard sample image matches the standard color distribution vector. Accordingly, the variations in color distribution of the samples can be absorbed, and a normalized sample image that is not dependent on the sample preparation method can be produced.

Also, the standard color distribution vector may be a mean vector of vectors indicating a color in the standard color space of each pixel included in each of a plurality of reference standard sample images, the plurality of reference standard sample images being images in the standard color space of the plurality of reference sample images obtained by capturing images of a plurality of samples prepared from the same reference specimen by using a plurality of sample preparation methods having different characteristics.

According to this configuration, a vector indicating a color is obtained from each pixel of each of a plurality of reference standard sample images having different characteristics in the sample preparation method, and the mean vector of the obtained vectors is defined as the standard color distribution vector. Accordingly, the standard color distribution vector can represent a standard color distribution.

For example, the positive rate may be a ratio of the number of positive pixels to a sum of the number of positive pixels and the number of negative pixels.

To be specific, the positive rate acquiring unit may include: a positive/negative identification unit configured to identify, from the normalized sample image, a pixel having a pixel value falling within a first threshold value range as a positive pixel and a pixel having a pixel value falling within a second threshold value range as a negative pixel; and a positive rate calculating unit configured to calculate a ratio of the number of positive pixels to a sum of the number of positive pixels and the number of negative pixels as the positive rate.

Also, the aforementioned image measurement apparatus may further include a threshold value adjusting unit configured to: when a positive pixel is designated to be added on the sample image displayed on a screen, change the first threshold value range to cause the designated positive pixel to be identified; and when a positive pixel is designated to be removed on the sample image displayed on the screen, change the first threshold value range to cause the designated positive pixel to not be identified.

According to this configuration, when a positive pixel is designated to be added or removed on the sample image displayed on the screen, in response thereto, the first threshold value range is changed. Accordingly, the threshold value setting person can change the first threshold value range with a simple method.

Also, in the aforementioned image measurement apparatus, the threshold value adjusting unit may be further configured to: when a negative pixel is designated to be added on the sample image displayed on the screen, change the second threshold value range to cause the designated negative pixel to be identified; and when a negative pixel is designated to be removed on the sample image displayed on the screen, change the second threshold value range to cause the designated negative pixel to not be identified.

According to this configuration, when a negative pixel is designated to be added or removed on the sample image displayed on the screen, in response thereto, the second threshold value range is changed. Accordingly, the threshold value setting person can change the second threshold value range with a simple method.

Also, the standard color space may be a Commission Internationale de l'Eclairage (CIE) uniform color space or an sRGB space.

An image measurement apparatus according to another aspect of the present invention includes: an image acquiring unit configured to acquire a sample image that is an image obtained by capturing an image of a sample; an input characteristics correcting unit configured to perform, on the sample image, a correction having characteristics inverse of characteristics obtained in the image capturing by the image acquiring unit so as to correct the sample image to obtain a standard sample image that is an image having color information that is not dependent on the characteristics of the image acquiring unit; a color distribution normalizing unit configured to convert the standard sample image into a normalized sample image by converting pixel values of pixels in the standard sample image to cause a color distribution vector indicating a color distribution of the standard sample image to match a predetermined standard color distribution vector indicating a standard color distribution; and a positive rate acquiring unit configured to detect positive pixels by performing threshold processing on pixel values of pixels in the normalized sample image, and acquire a positive rate indicating a proportion of the detected positive pixels.

According to this configuration, a correction having characteristics inverse of the characteristics obtained in the image capturing by the image acquiring unit is performed on the sample image. It is thereby possible to convert the sample image into an image having common color information that is not dependent on the characteristics of the image acquiring unit. Also, the color distribution normalizing unit converts the pixel value of each pixel in the standard sample image such that the color distribution vector of the standard sample image matches the standard color distribution vector. Accordingly, the variations in color distribution of the samples can be absorbed, and a normalized sample image that is not dependent on the sample preparation method can be produced. By acquiring a positive rate from the normalized sample image, it is possible to acquire the positive rate that is not dependent on the characteristics of the image acquiring unit and is not dependent on the differences in sample preparation. In other words, it is possible to identify a specific object of interest by using fixed threshold values without being affected by the color variations due to sample preparation.

These general and specific aspects may be implemented using a system, a method, an integrated circuit, a computer program, or a computer-readable recording medium such as a CD-ROM, or any combination of systems, methods, integrated circuits, computer programs, or recording media.

Hereinafter, embodiments of the present disclosure will be described in detail with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

In the present embodiment, a description will be given of an image measurement apparatus that can absorb color differences caused due to differences in sample preparation through color conversion, and can calculate a positive rate that indicates the proportion of positive pixels by using a fixed threshold value database.

Figure 1:
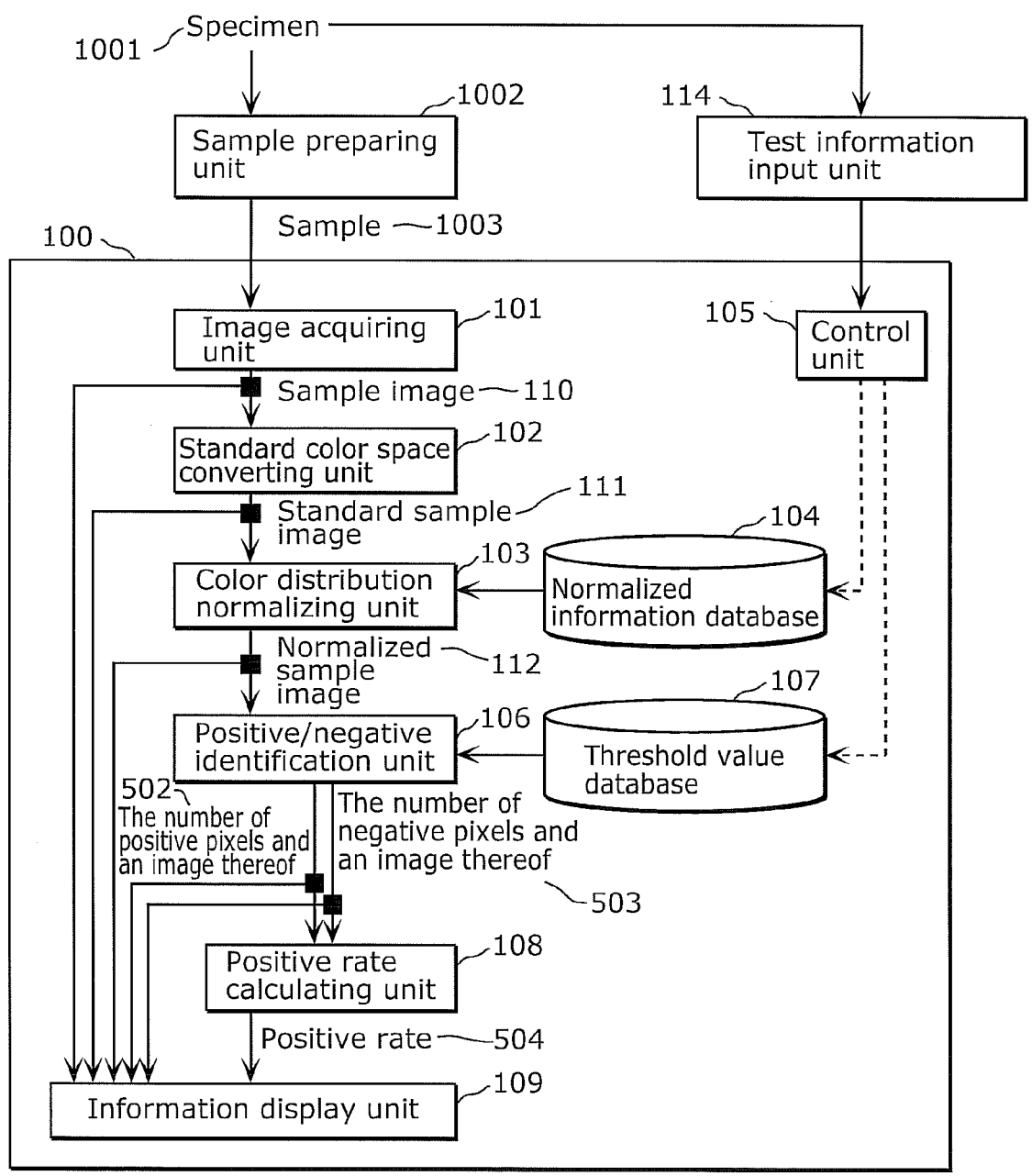
FIG. 1 is a block diagram showing a configuration of an image measurement apparatus according to Embodiment 1.

FIG. 1 is a block diagram showing a configuration of an image measurement apparatus according to Embodiment 1 of the present disclosure.

An image measurement apparatus 100 is an apparatus that detects a positive rate of a sample from an image obtained by capturing an image of the sample. The image measurement apparatus 100 includes an image acquiring unit 101, a standard color space converting unit 102, a color distribution normalizing unit 103, a normalized information database 104, a control unit 105, a positive/negative identification unit 106, a threshold value database 107, a positive rate calculating unit 108, and an information display unit 109.

The image acquiring unit 101 acquires a sample image 110 by capturing an image of a sample 1003 prepared in advance from a specimen 1001 in a sample preparing unit 1002 by using a scanner, a digital camera or the like provided in the image acquiring unit 101.

Figure 2:
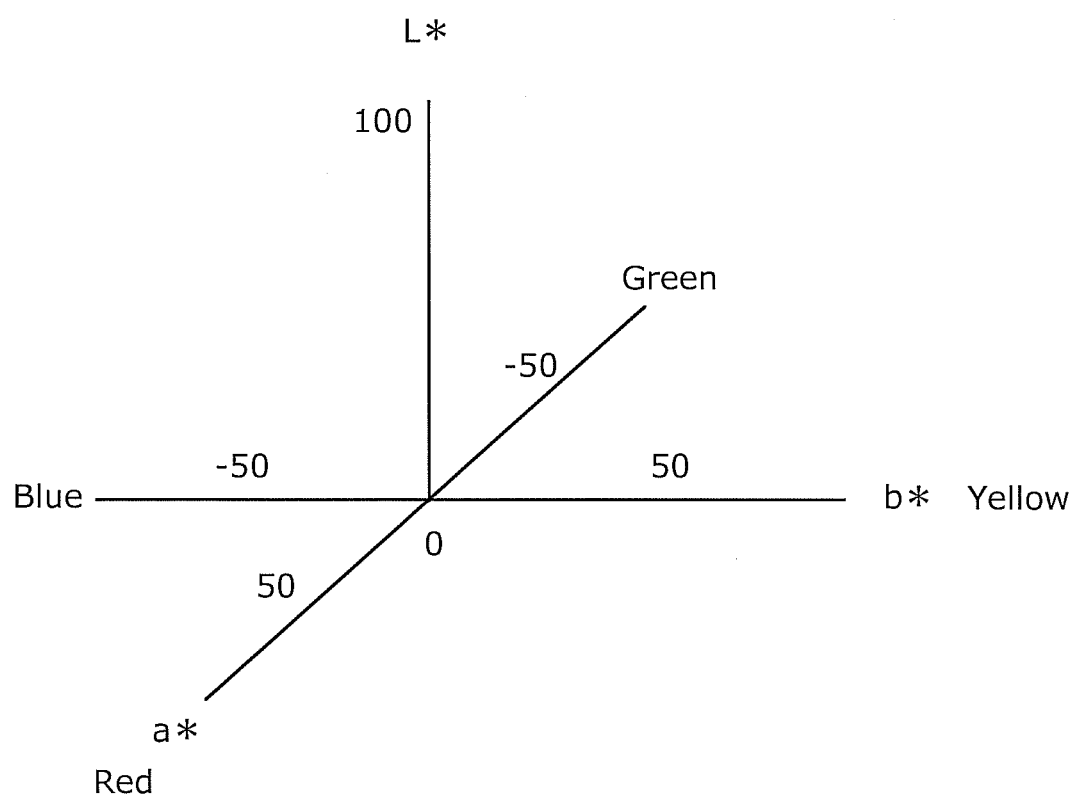
FIG. 2 is a diagram showing an example of CIELAB (Lab color space).

The standard color space converting unit 102 converts the sample image 110 into a standard sample image 111 that is an image in a standard color space. That is, the standard color space converting unit 102 converts the sample image 110 into the standard sample image 111 by converting the pixel value of each pixel in the sample image 110 into a signal value in the standard color space. The standard color space can be, for example, a CIELAB (Lab color space) or a sRGB space that is a CIE uniform color space, or a color space used in color management systems. As shown in FIG. 2, the CIELAB is a three-dimensional color space consisting of L* representing brightness, a* primarily representing a red-green component, and b* primarily representing a yellow-blue component. As a result of conversion of the pixel values of the sample image 110 into signal values in a colorimetrically defined color space, the color information of the sample image 110 is replaced by common color information that is not dependent on the image acquiring unit 101.

In order to absorb the variations in color distribution of the samples, the color distribution normalizing unit 103 converts the standard sample image 111 into a normalized sample image 112 by performing normalization processing on the standard sample image 111.

Specifically, the color distribution normalizing unit 103 converts the standard sample image 111 into the normalized sample image 112 by converting the pixel values of the pixels in the standard sample image 111 such that a color distribution vector indicating the color distribution of the standard sample image 111 matches a predetermined standard color distribution vector indicating the standard color distribution.

First, normalization processing for absorbing variations in the sample distribution will be described.

Figure 3:
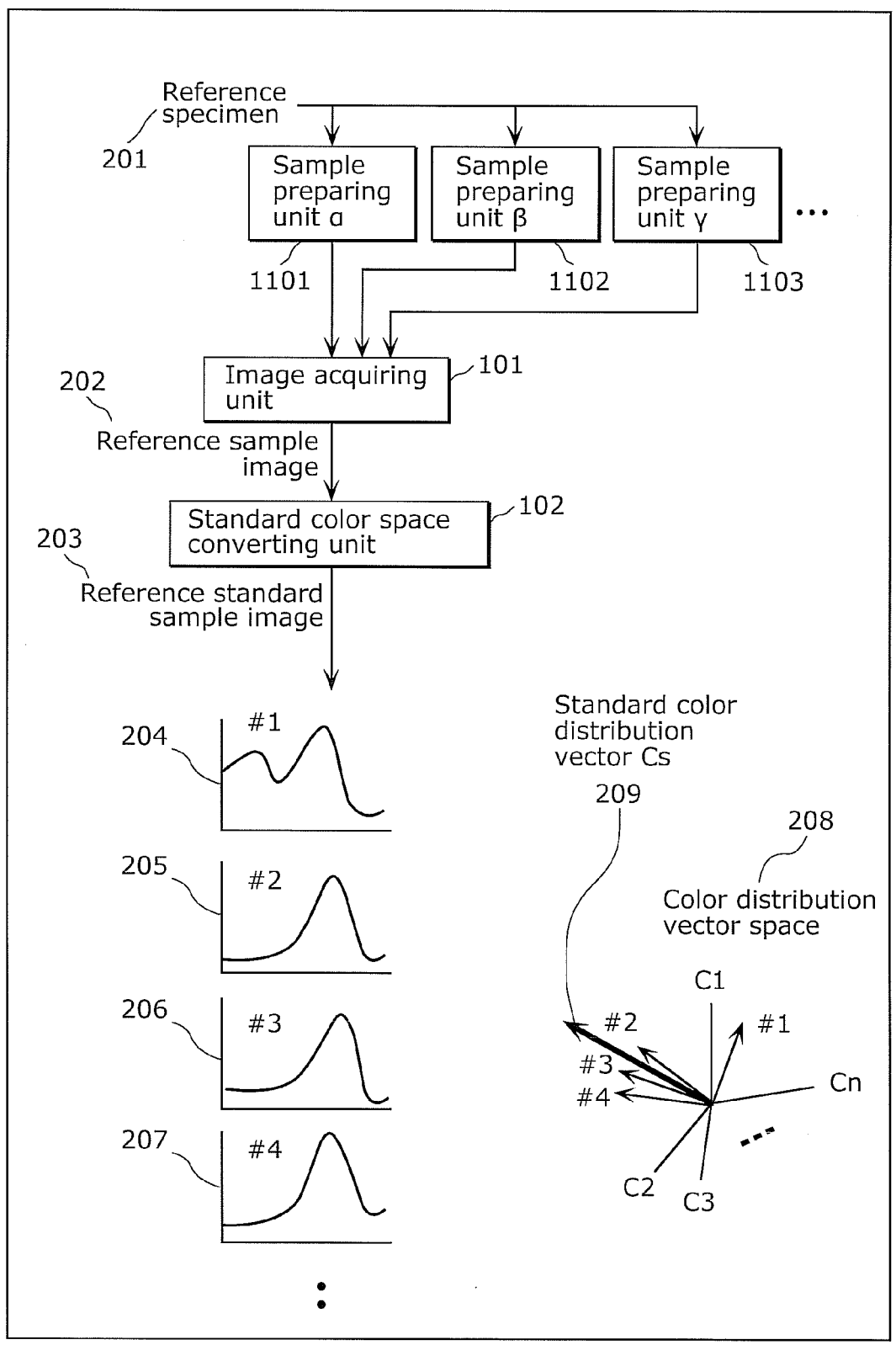
FIG. 3 is a diagram showing an example of calculation of a standard color distribution vector Cs.

FIG. 3 is a diagram illustrating a method for calculating a standard color distribution vector indicating the standard color distribution. In order to know the variations in the sample distribution, as shown in FIG. 3, a plurality of sample preparing units (a sample preparing unit α 1101, a sample preparing unit β 1102, a sample preparing unit γ 1103, . . . ) prepare samples from a single reference specimen 201. The image acquiring unit 101 acquires a plurality of reference sample images 202 by capturing an image of each prepared sample.

Differences in the sample preparing units refer to differences in the characteristics of the sample preparing units. Specifically, variations in the sample preparation process, differences in the sample preparation facility and the like are conceived. The samples are obtained through a plurality of steps including fixing, embedding, slicing, smearing and staining, and thus the state of a sample is influenced by various factors such as the fixing time, the concentration of formalin used in fixing, and the dried state of the specimen.

In order to convert the color information of each reference sample image 202 into color information that is not dependent on the image acquiring unit 101, the standard color space converting unit 102 converts each reference sample image 202 into a reference standard sample image 203 that is an image in the standard color space.

When samples having difference characteristics are captured, as shown in FIG. 3, different color histograms 204 to 207 are obtained with respect to the reference standard sample images 203. In each color histogram, the horizontal axis indicates color in the standard color space, and the vertical axis indicates frequency (the number of pixels in the reference standard sample image 203). To be specific, the horizontal axis indicates n colors from C1 to Cn. If, for example, it is assumed that in the CIELAB, each of L*, a* and b* is divided into nine, n will be 729 (=9×9×9). When each color histogram is expressed with a multidimensional vector (n-dimensional vector), each color histogram can be plotted as a single point in a color distribution vector space 208. Accordingly, for example, the color histogram 204 (#1) can be expressed as a color distribution vector #1. The difference between color histograms can be expressed with a distance between the color distribution vectors. In the example shown in FIG. 3, the distance between a color distribution vector #2 and a color distribution vector #4 is short, from which it can be seen that the color histogram 205 (#2) and the color histogram 207 (#4) are similar. The mean vector of the color distribution vectors plotted in the color distribution vector space 208 is generated as a standard color distribution vector Cs 209. It is thereby possible to set the standard color distribution vector Cs 209 that has absorbed the variations of the samples having individually different characteristics.

The method for setting the standard color distribution vector Cs 209 is not limited thereto. It may be possible to, for example, set the color distribution vector of white having a color temperature of 6500 K that is one of the standard light sources as the standard color distribution vector Cs 209. Alternatively, the color distribution vector of white displayed on the screen of the information display unit 109 may be set as the standard color distribution vector Cs 209. Alternatively, the standard color distribution vector Cs 209 may be set based on the diagnostic guidelines formulated by medical experts, or the like. Furthermore, in order to make a comparison with historical cases, a standard color distribution vector Cs 209 representing a color distribution of the historical cases may be set.

The normalization processing refers to conversion of the pixel value of each pixel in the standard sample image 111 such that the color distribution vector of the standard sample image 111 of the sample 1003 for which the positive rate is detected matches the standard color distribution vector Cs 209. The conversion of the color distribution vector C of the standard sample image 111 into the standard color distribution vector Cs can be expressed by Equation 1.

[Math. 1]

$$C_S = MC \qquad \text{(Equation 1)}$$

An example of a method for calculating a matrix M will now be described with reference to FIG. 4.

As described in relation to FIG. 3, the standard color distribution vector Cs 209 is calculated based on the color histogram. Accordingly, the color distribution of the standard sample image 111 is expressed by using a color histogram. FIG. 4 shows a color histogram 301 of the standard sample image 111. As in FIG. 3, by expressing the color histogram 301 with a multidimensional vector and plotting the vector in a color distribution vector space 302, a standard sample color distribution vector C 303 is obtained. The standard sample color distribution vector C 303 is the color distribution vector C of the standard sample image 111 in Equation 1. Here, the color distribution vector space 302 and the color distribution vector space 208 are the same space.

The matrix M can be calculated by transforming Equation 1 into Equation 2.

[Math. 2]

$$M = CC_S^{-1} \qquad \text{(Equation 2)}$$

Figure 5:
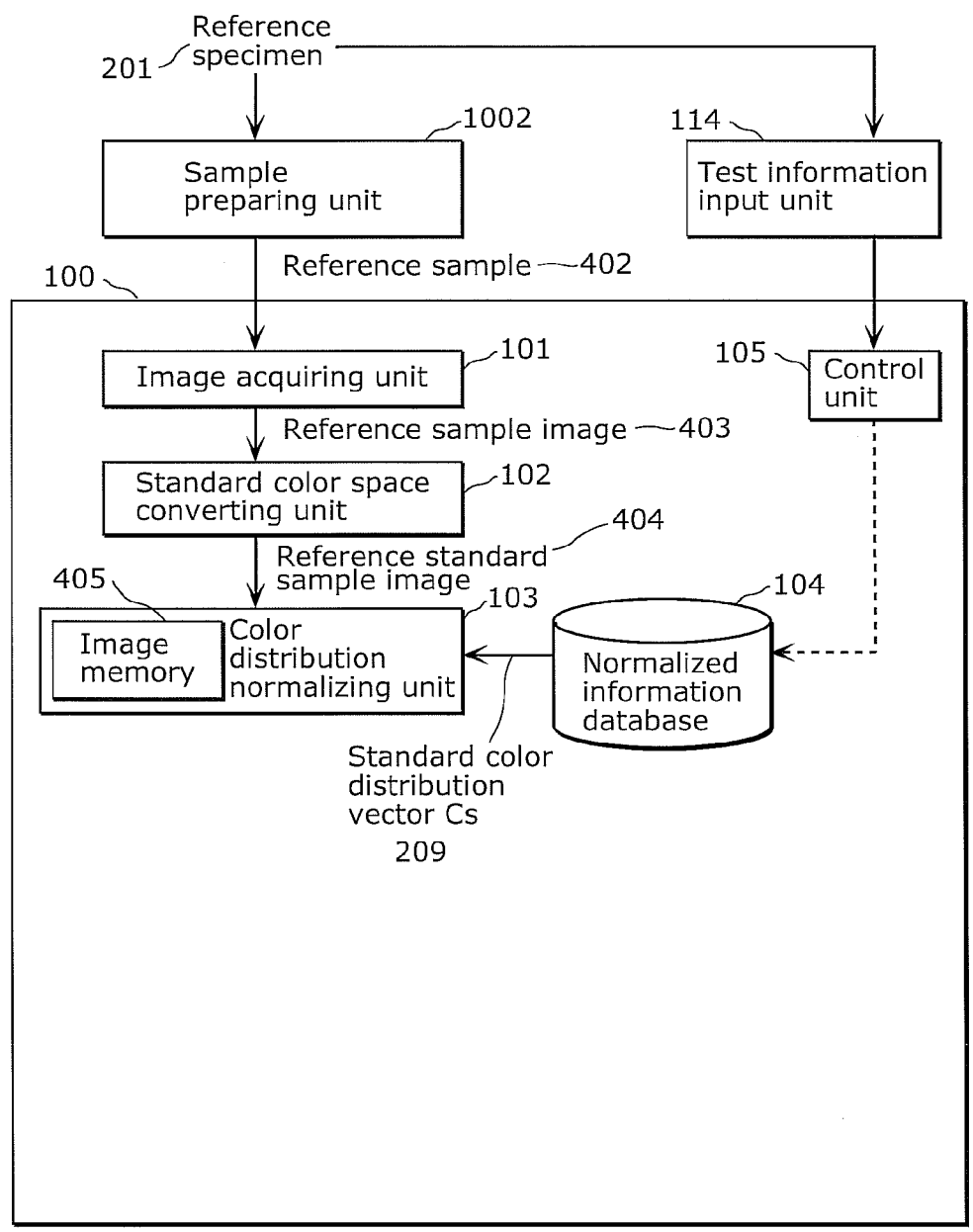
FIG. 5 is a diagram illustrating an operation performed to produce a standard color distribution vector Cs that is stored in a normalized information database.

FIG. 5 is a diagram illustrating an operation performed to produce the standard color distribution vector Cs 209 that is stored in the normalized information database 104 by using the image measurement apparatus. FIG. 5 shows some of the functions of the image measurement apparatus 100 shown in FIG. 1.

The sample preparing unit 1002 prepares a reference sample 402 from a reference specimen 201. The image acquiring unit 101 acquires a reference sample image 403 by capturing an image of the reference sample 402. The standard color space converting unit 102 generates a reference standard sample image 404 by converting the reference sample image 403 into color signals that are not dependent on the characteristics of the image acquiring unit 101.

The color distribution normalizing unit 103 includes an image memory 405, and temporarily saves the reference standard sample image 404 in the image memory 405. Next, a change is made to the characteristics of the sample preparing unit 1002, and the sample preparing unit 1002 prepares a reference sample 402 from the reference specimen 201. After a plurality of reference standard sample images 404 have been saved in the image memory 405 through the procedure described above, the color distribution normalizing unit 103 calculates a standard color distribution vector Cs 209 in the manner described with reference to FIG. 3.

Figure 6:
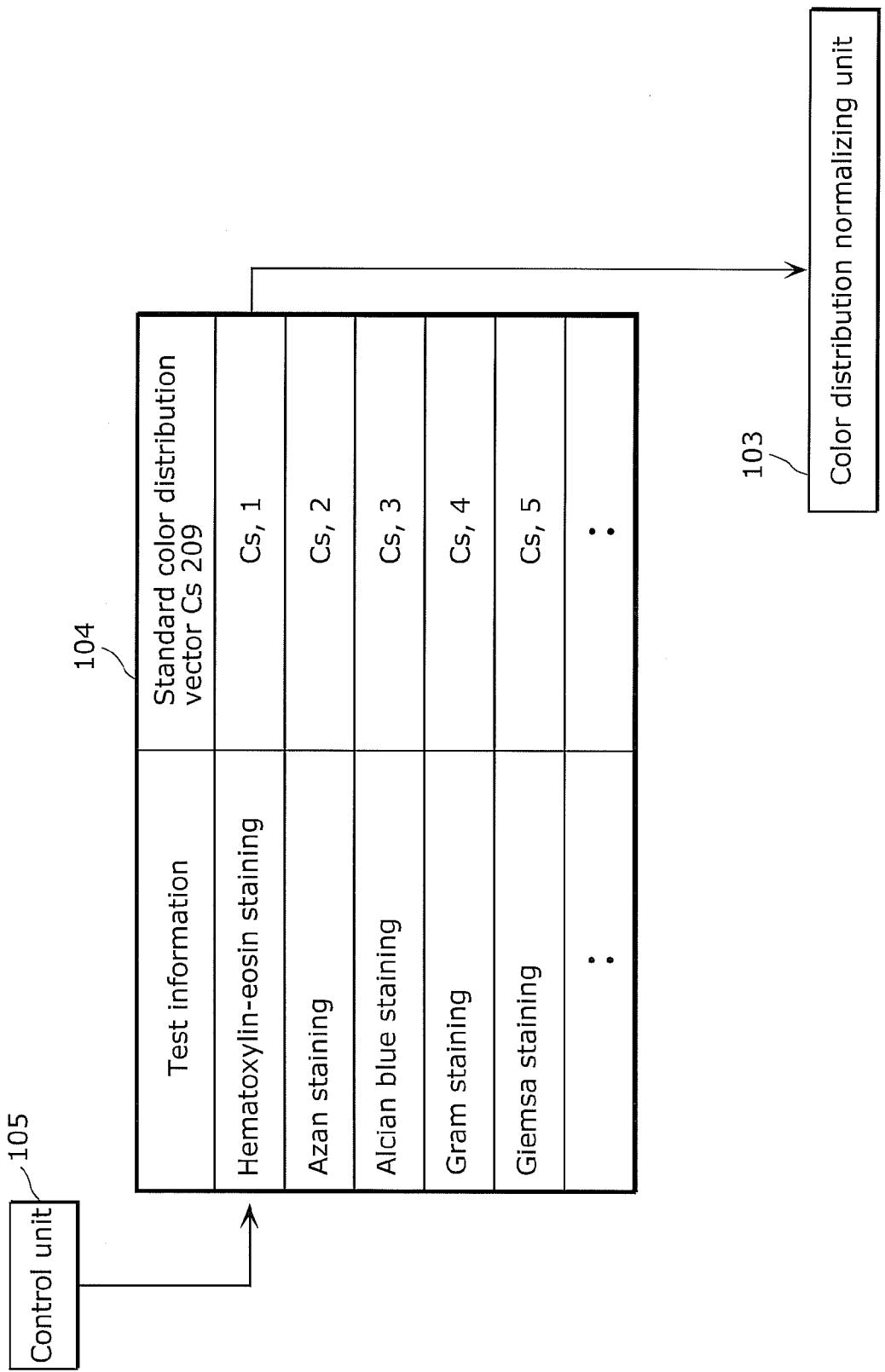
FIG. 6 is a diagram illustrating an example of a configuration of the normalized information database.

The normalized information database 104 includes, as shown in FIG. 6, a plurality of standard color distribution vectors Cs 209 according to differences in the stain method or the like. The color distribution normalizing unit 103 selects a standard color distribution vector Cs 209 from the normalized information database 104 in accordance with an instruction from the control unit 105. The control unit 105 has the function of controlling the entire operation of the image measurement apparatus 100 upon receiving test conditions of the reference specimen 201 such as stain method from a test information input unit 114.

Referring to FIG. 1, the image measurement apparatus 100 includes a positive/negative identification unit 106 and a positive rate calculating unit 108 as an example of a positive rate acquiring unit configured to detect positive pixels by performing threshold processing on the pixel value of each pixel in the normalized sample image 112 so as to acquire a positive rate indicating the proportion of detected positive pixels.

Figure 7:
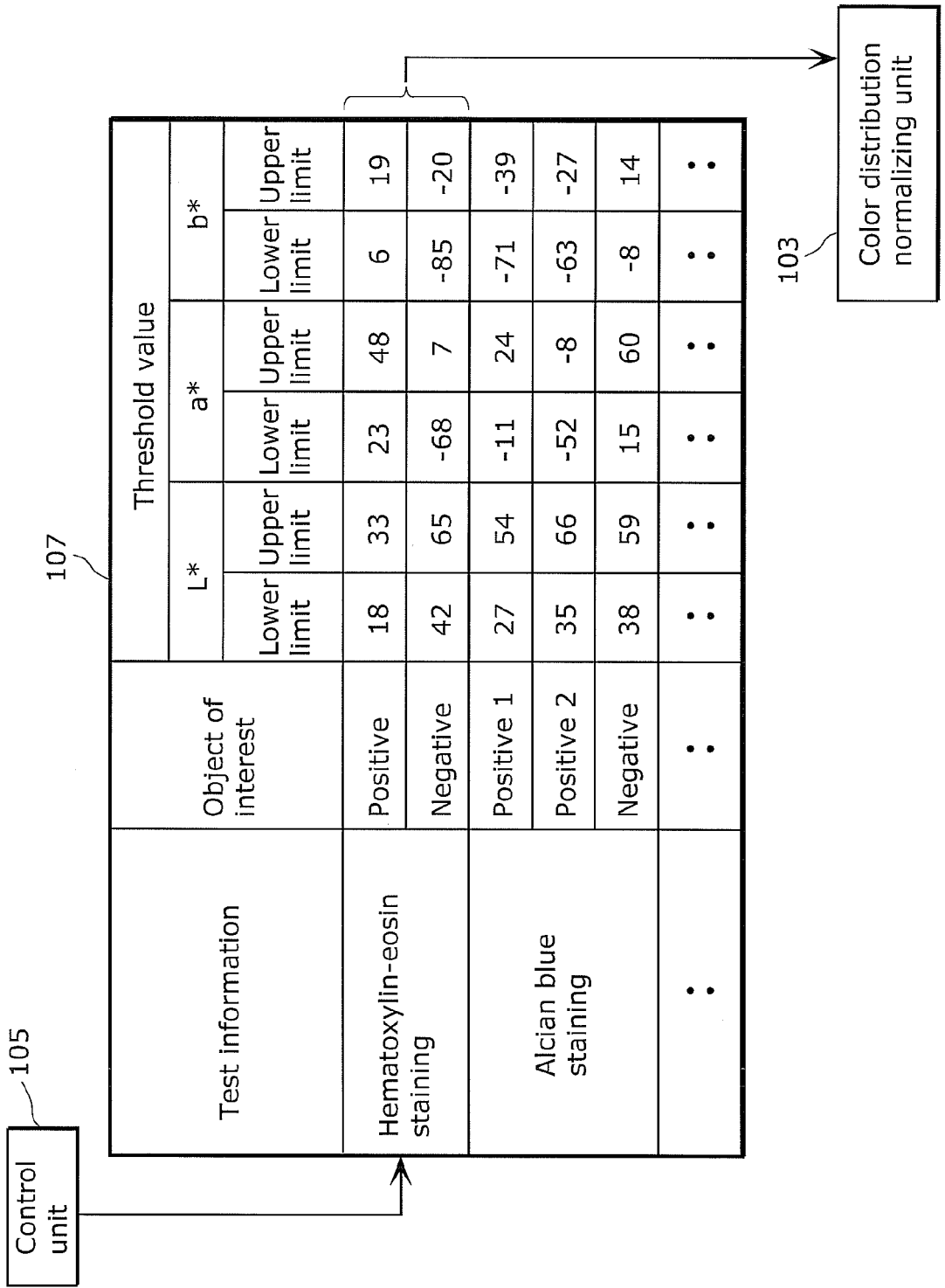
FIG. 7 is a diagram illustrating an example of a configuration of a threshold value database.

The positive/negative identification unit 106 performs threshold processing on the pixel value of each pixel in the normalized sample image 112, and identifies a positive area, a negative area and a background area. For example, the positive/negative identification unit 106 identifies, from among the normalized sample image 112, the pixels having a pixel value falling within a first threshold value range as positive pixels, and identifies the pixels having a pixel value falling within a second threshold value range as negative pixels. The threshold values are supplied from the threshold value database 107 shown in FIG. 7. A lower limit threshold value and an upper limit threshold value are set for each of the L* pixel value, the a* pixel value and the b* pixel value. If all of the L*, a* and b* pixel values are within their range between the lower limit threshold value and the upper limit threshold value, the pixel is determined as a pixel belonging to the positive area or a pixel belonging to the negative area. For example, in the case of hematoxylin-eosin staining, if the L* pixel value is 25, the a* pixel value is 30, and the b* pixel value is 10, the pixel is determined as a pixel belonging to the positive area. In the case of Alcian blue staining, neutral polysaccharides or neutral mucins in glycoproteins test positive only in the PAS reaction (Periodic Acid Shiff reaction) and appear reddish purple, and acidic mucopolysaccharides test positive only in the Alcian blue and appear blue. Accordingly, two sets of threshold values are set to test positive.

Figure 8:
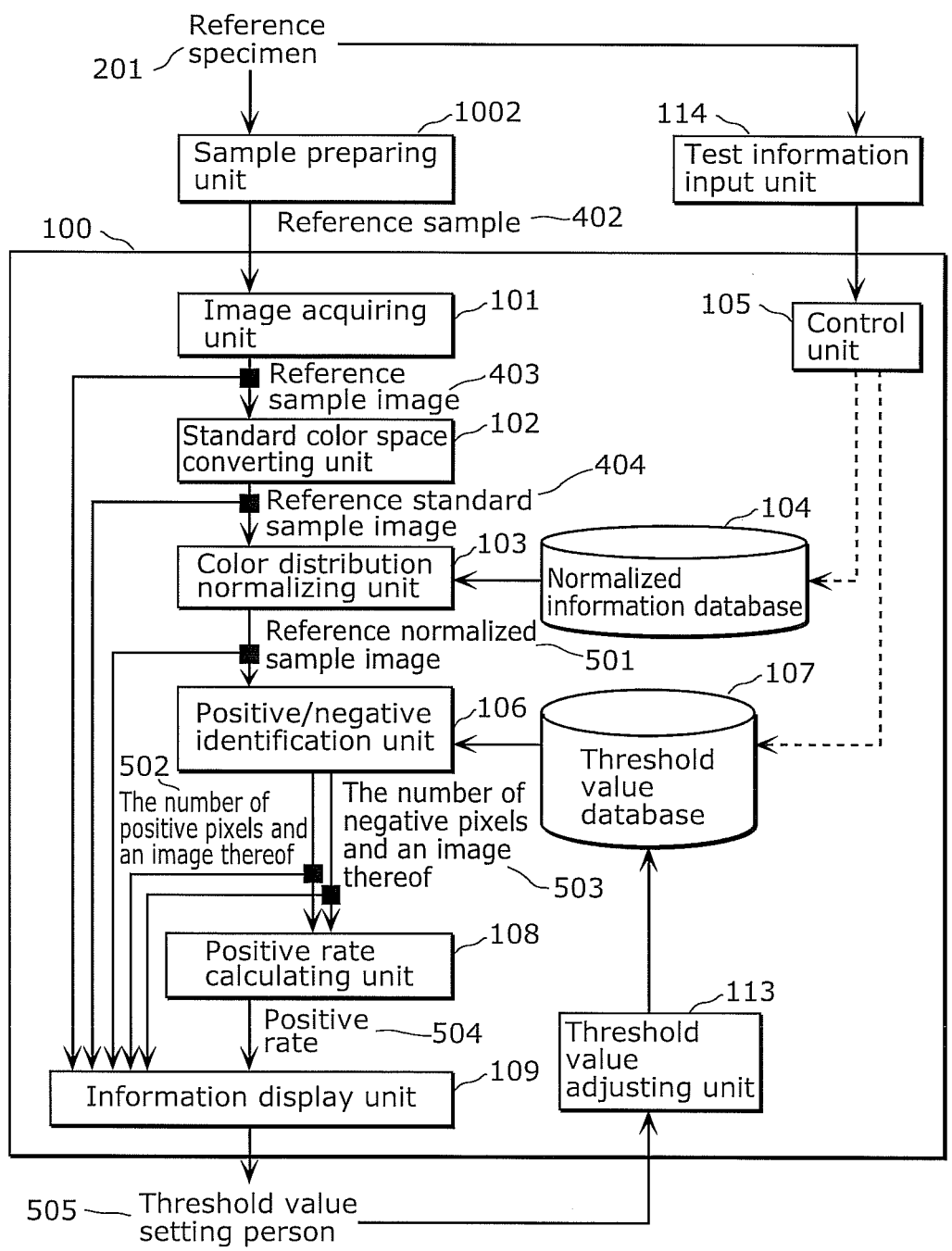
FIG. 8 is a diagram illustrating an operation for creating the threshold value database.

FIG. 8 is a diagram illustrating an operation for creating the threshold value database 107. As shown in FIG. 8, the image measurement apparatus 100 further includes a threshold value adjusting unit 113.

The process for obtaining a reference standard sample image 404 from a reference specimen 201 has already been described with reference to FIG. 5. Accordingly, a detailed description thereof is omitted here. The color distribution normalizing unit 103 acquires the standard color distribution vector Cs 209 from the normalized information database 104, and calculates a reference normalized sample image 501 from the reference standard sample image 404 based on Equation 1.

Figure 9:
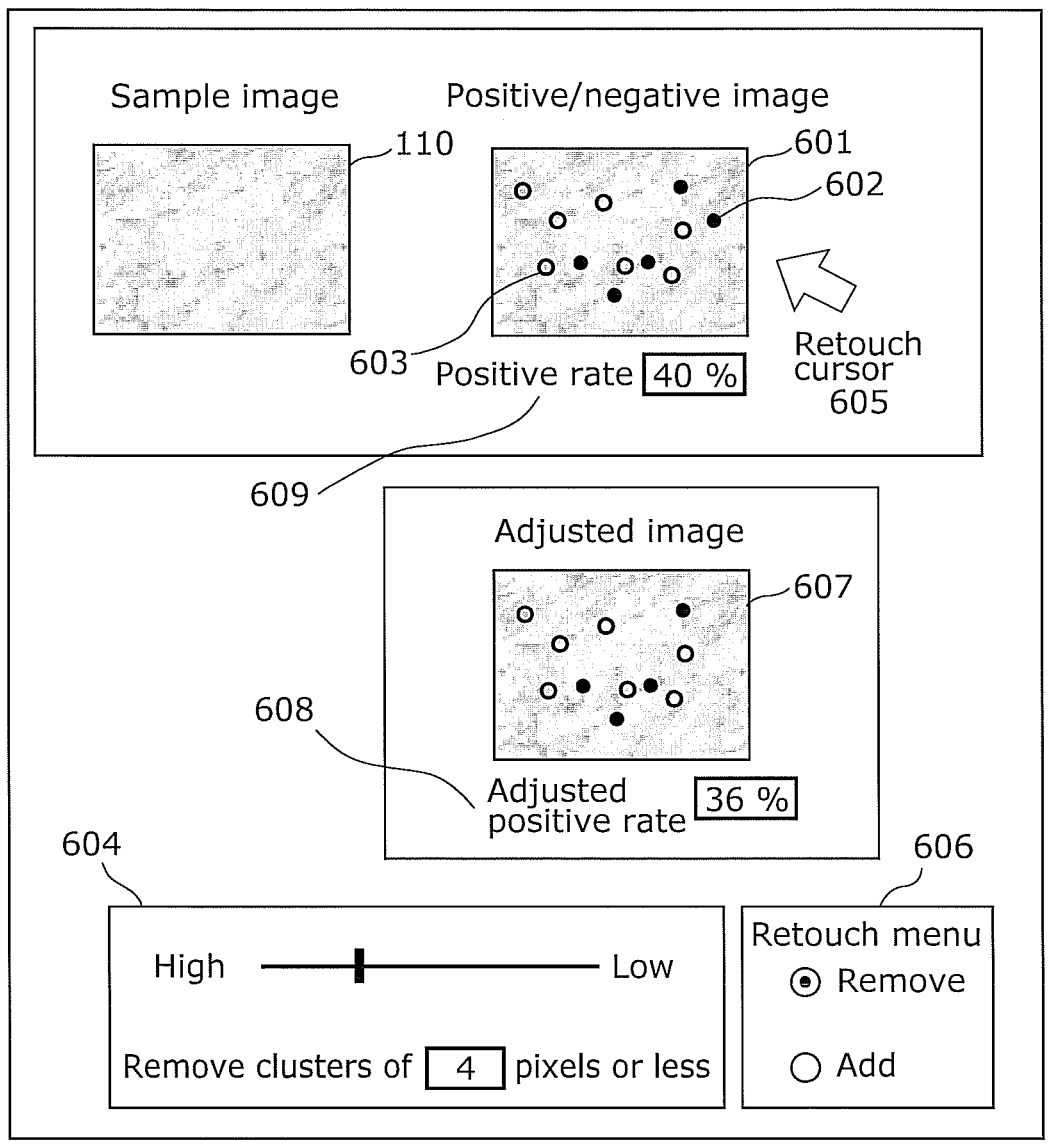
FIG. 9 is a diagram showing an example of display of an information display unit.

The positive/negative identification unit 106 performs threshold processing on the pixel value of each pixel in the reference normalized sample image 501 by using an initial threshold value that is pre-set in the threshold value database 107, and thereby identifies the positive area, the negative area and the background area. The information display unit 109 displays the result of threshold processing on the screen. FIG. 9 is a diagram showing an example of the result of threshold processing displayed by the information display unit 109. As shown in FIG. 9, a positive/negative image 601 indicating the result of threshold processing is displayed. In the positive/negative image 601, black circles 602 indicate positive areas, and white circles 603 indicate negative areas.

Figure 10:
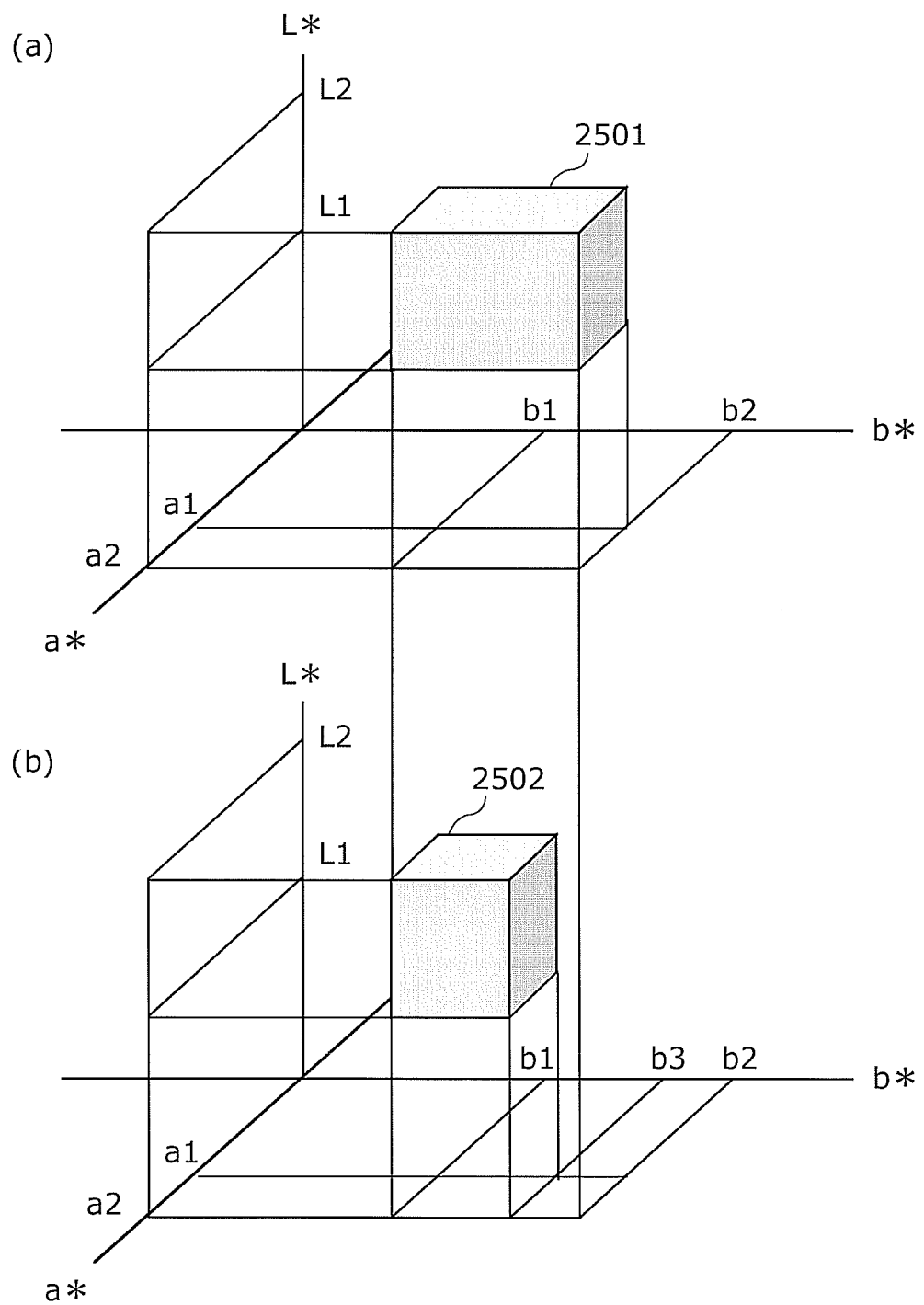
FIG. 10 show diagrams illustrating threshold value changing processing, with FIG. 10(a) being a diagram showing a target range when the upper limit threshold value is set to b2, and FIG. 10(b) being a diagram showing a target range when the upper limit threshold value is set to b3.

If the number of detected positive pixels or negative pixels is excessively large, the threshold processing performed by the positive/negative identification unit 106 can be changed to higher stringency threshold processing by a threshold value setting person 505 moving the slide bar of an adjustment menu 604 toward the left by using a mouse or the like. The higher stringency threshold processing refers to processing for narrowing the threshold value range for detecting a target (positive pixel or negative pixel). The threshold value adjusting unit 113 changes the lower limit threshold value for detecting the target to a greater value or changes the upper limit threshold value to a smaller value. The target can be a positive pixel or a negative pixel. The threshold value setting person 505 may set in advance as to which of positive pixels and negative pixels is set as the target. FIG. 10 shows an example in which an upper limit threshold value b2 of b* is changed to a lower value b3. A target 2501 in FIG. 10(a) is located in an area corresponding to between a lower limit threshold value lot and the upper limit threshold value b2 on the b* axis. Through threshold processing, the pixels having L*a*b* values (L* value, a* value and b* value) within the target 2501 are detected. By changing the upper limit threshold value b2 of b* to the lower value b3, a target 2502 shown in FIG. 10 (b) is obtained. The range of the target 2502 is smaller than that of the target 2501 because the volume is reduced, and thus the number of detected pixels is also reduced.

Figure 11:
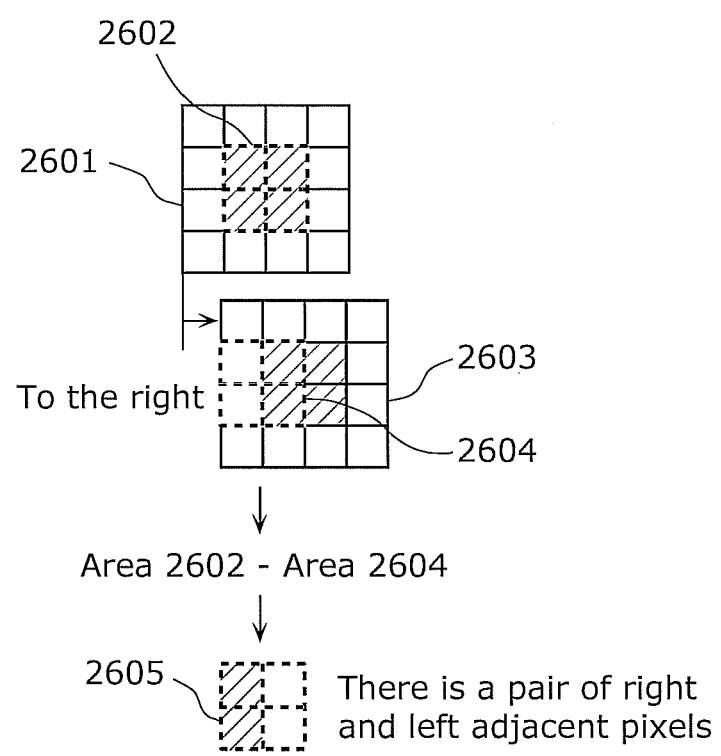
FIG. 11 is a diagram showing an example of a method for detecting a pixel cluster.

If, on the other hand, the number of detected positive pixels or negative pixels is insufficient, the threshold processing performed by the positive/negative identification unit 106 can be changed to lower stringency threshold processing by the threshold value setting person 505 moving the slide bar of the adjustment menu 604 toward the right by using a mouse or the like. The lower stringency threshold processing refers to processing for widening the threshold value range for detecting a target. Through this processing, the target range is widened. Specifically, the threshold value adjusting unit 113 changes the lower limit threshold value for detecting the target to a smaller value or changes the upper limit threshold value to a greater value. In the case where there is a large amount of positive pixel or negative pixel noise in the positive/negative image 601, the threshold value setting person 505 can remove the noise by inputting a numerical value in a field provided in the adjustment menu 604. FIG. 9 shows an example of input when clusters of four pixels or less are removed as noise. As shown in FIG. 11, a pixel cluster can be detected by taking differences between pixels by shifting the image up, down, right and left on a pixel-by-pixel basis. For example, an image 2601 has a cluster of four pixels in an area 2602 having a size of 2×2 pixels. It is assumed here that detected positive pixels or negative pixels have a pixel value of 1, and the other pixels have a pixel value of 0. In FIG. 11, the detected positive pixels or negative pixels are hatched. An image obtained after the image 2601 has been moved to the right in an amount of one pixel is indicated by reference numeral 2603. The threshold value adjusting unit 113 sets an area 2604 having a size of 2×2 pixels at the same position as the area 2602 in the image 2603.

The threshold value adjusting unit 113 obtains an area 2605 by subtracting the pixel values within the area 2604 from the pixel values within the area 2602. If there is a pixel having a pixel value of 0 in the area 2605, it can be seen that there are pixels that are adjacent to the pixel on the right and left sides.

Figure 12:
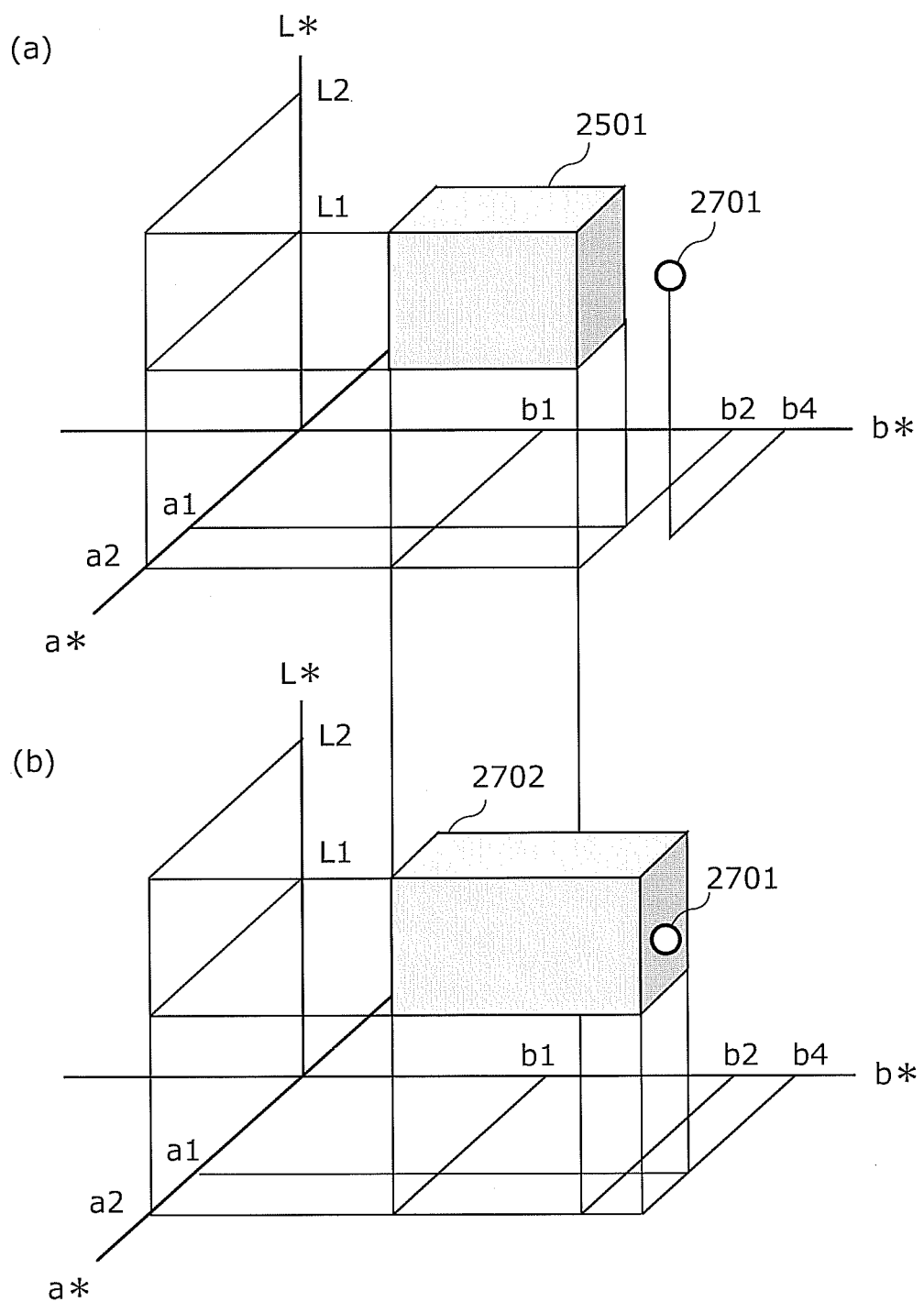
FIG. 12 show diagrams illustrating threshold value correction processing, with FIG. 12 (a) being a diagram showing a pixel located outside a target, and FIG. 12(b) being a diagram showing the target after the threshold value has been changed so as to include the pixel shown in FIG. 12(a) in the target.

Furthermore, the threshold value setting person 505 can provide an instruction (retouch menu 606) to remove or add a pixel on the image by using a retouch cursor 605. As used herein, "instruction to add" means to add a correction to the threshold value such that the pixel designated by the retouch cursor 605 can be detected as a target. As shown in FIG. 12(a), a pixel 2701 designated to be added is located outside the target 2501 in the L*a*b* space. The threshold value adjusting unit 113 corrects the upper limit threshold value b2 to a value b4 that is the same value as the b* coordinates of the pixel 2701 such that the pixel 2701 can be detected. By doing so, the range, or in other words, volume of a target 2702 is widened to include the pixel 2701. The threshold value adjusting unit 113 reflects the threshold value that has been changed to the threshold value database 107. The positive/negative identification unit 106 calculates the number of positive pixels and an image thereof 502, and the number of negative pixels and an image thereof 503 based on the threshold value that has been changed. The information display unit 109 displays the positive pixel image and the negative pixel image as an adjusted image 607.

A corrected value of the positive rate is displayed as an adjusted positive rate 608.

The positive rate calculating unit 108 receives the number of positive pixels and the number of negative pixels from the positive/negative identification unit 106, and calculates a positive rate. The number of positive pixels refers to the total obtained by adding the number of pixels in each of all the positive areas, and the number of negative pixels refers to the total obtained by adding the number of pixels in each of all the negative areas. The positive rate is calculated by, for example, Equation 3.

$$\text{Positive rate} = \text{(the number of positive pixels)}/\text{(the number of positive pixels+the number of negative pixels)} \quad \text{(Equation 3)}$$

Equation 3 is merely an example of a positive rate calculation method, and thus the positive rate may be calculated by any other method.

The information display unit 109 displays the sample image 110, the positive/negative image 601, and the adjusted image 607 as shown in FIG. 9. The information display unit 109 also displays the positive rate calculated by the positive rate calculating unit 108 as a positive rate 609, an adjusted positive rate 608.

Figure 13:
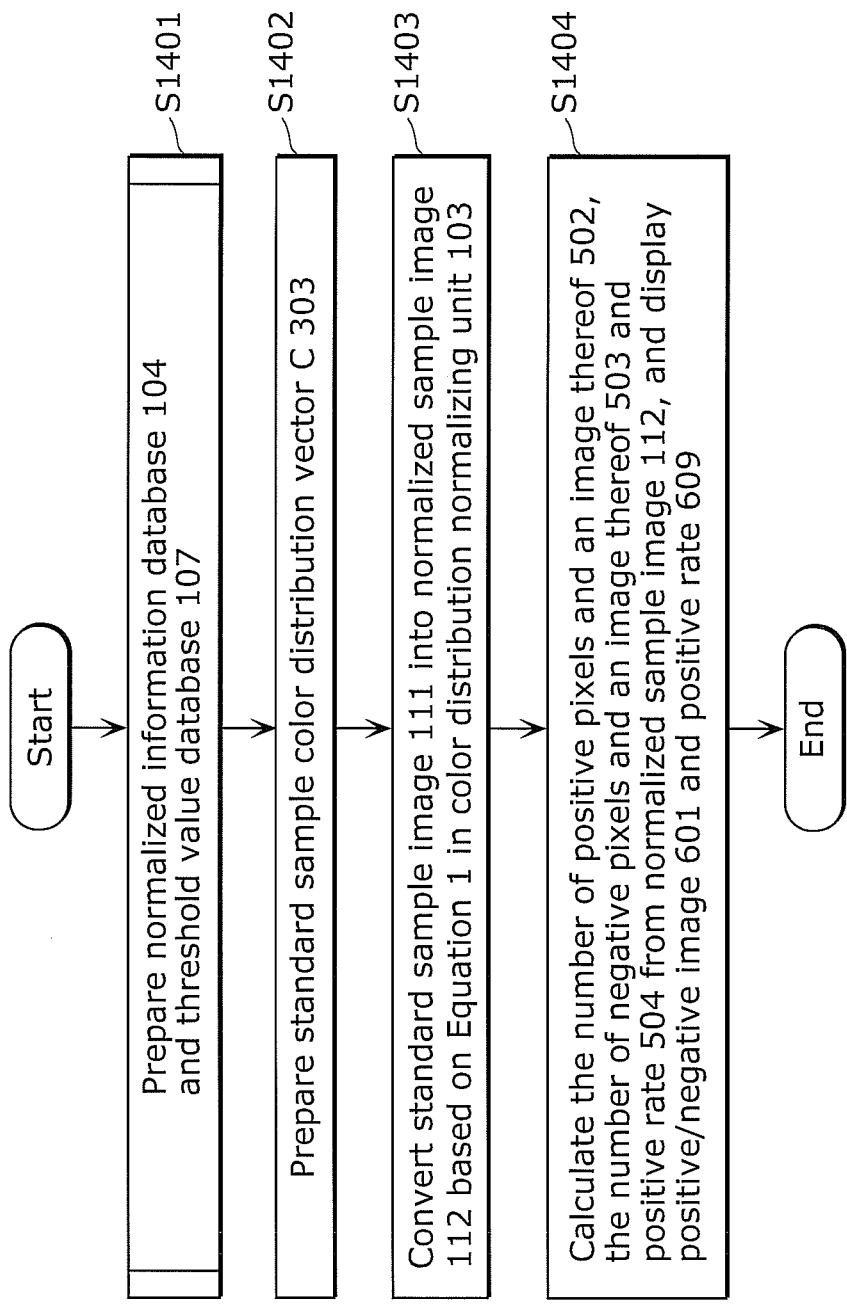
FIG. 13 is a flowchart illustrating an operation performed by the image measurement apparatus.

FIG. 13 is a flowchart illustrating an operation performed by the image measurement apparatus 100.

First, in step S1401, preparation of the normalized information database 104 and the threshold value database 107 is performed.

Figure 14:
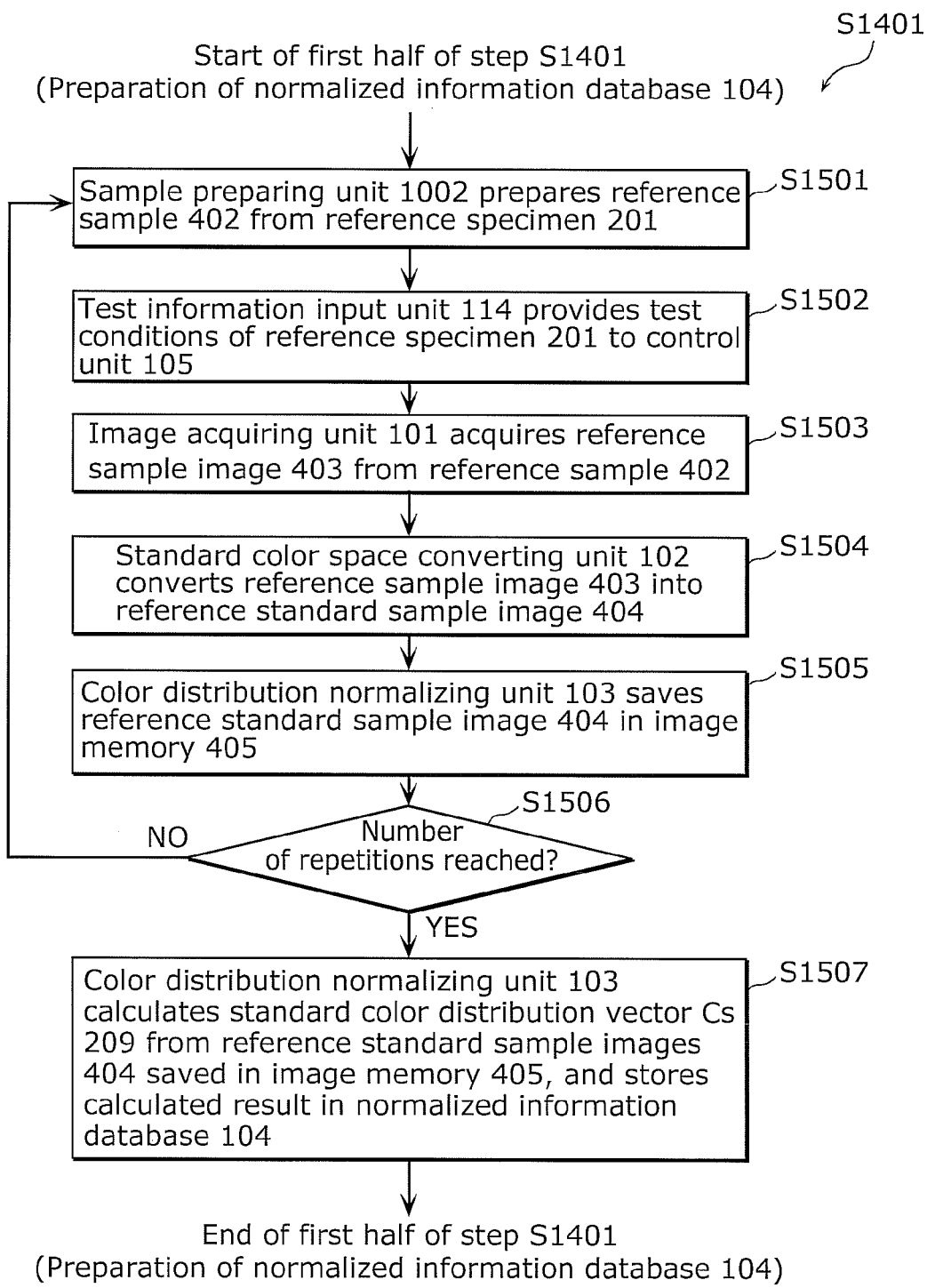
FIG. 14 is a flowchart illustrating processing for preparing the normalized information database.

FIG. 14 is a flowchart illustrating processing for preparing the normalized information database 104 (the first half of step S1401).

In step S1501, the sample preparing unit 1002 prepares a reference sample 402 from a reference specimen 201. To be specific, the sample preparing unit 1002 fixes the reference specimen 201, and thereafter performs an embedding step, a slicing step, a smearing step, a staining step and the like to prepare the reference sample 402.

In step S1502, the test information input unit 114 provides test conditions of the reference specimen 201 to the control unit 105.

In step S1503, the image acquiring unit 101 acquires a reference sample image 403 by capturing an image of the reference sample 402.

In step S1504, the standard color space converting unit 102 converts the reference sample image 403 into a reference standard sample image 404. Through this, the reference sample image 403 can be expressed by signal values in the standard color space that is not influenced by the characteristics of the image acquiring unit 101.

In step S1505, the color distribution normalizing unit 103 saves the reference standard sample image 404 in the image memory 405.

In step S1506, it is determined as to whether the processing from step S1501 to step S1505 has been repeated a predetermined number of times. The number of repetitions corresponds to the number of conditions set in the sample preparing unit 1002, and thus the processing from step S1501 to step S1505 is repeated the same number of times as the number of reference samples 402 prepared under various conditions. The number of conditions set in the sample preparing unit 1002 is determined by various factors such as, for example, differences in the fixing time, the concentration of formalin used in fixing, the dried state of the specimen.

Figure 4:
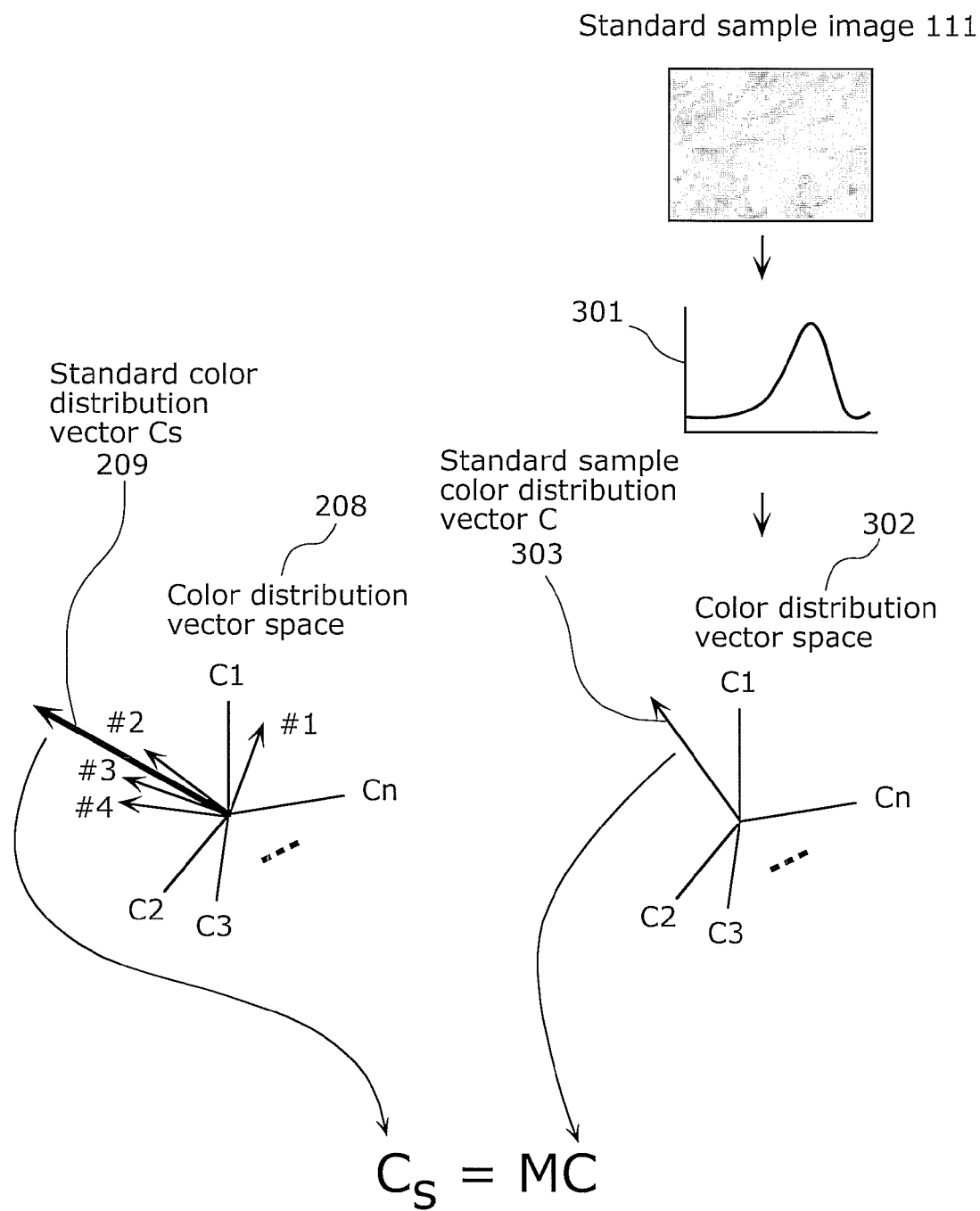
FIG. 4 is a diagram showing an example of a method for calculating a matrix M.

In step S1507, the color distribution normalizing unit 103 calculates a standard color distribution vector Cs 209 shown in FIG. 4 based on a plurality of reference standard sample images 404 saved in the image memory 405. The color distribution normalizing unit 103 stores the standard color distribution vectors Cs 209 in the normalized information database 104 for each stain method, for example, as shown in FIG. 6 based on the test conditions from the control unit 105.

Through the processing from step S1501 to step S1507 described above, the preparation of the normalized information database 104 ends.

Figure 15:
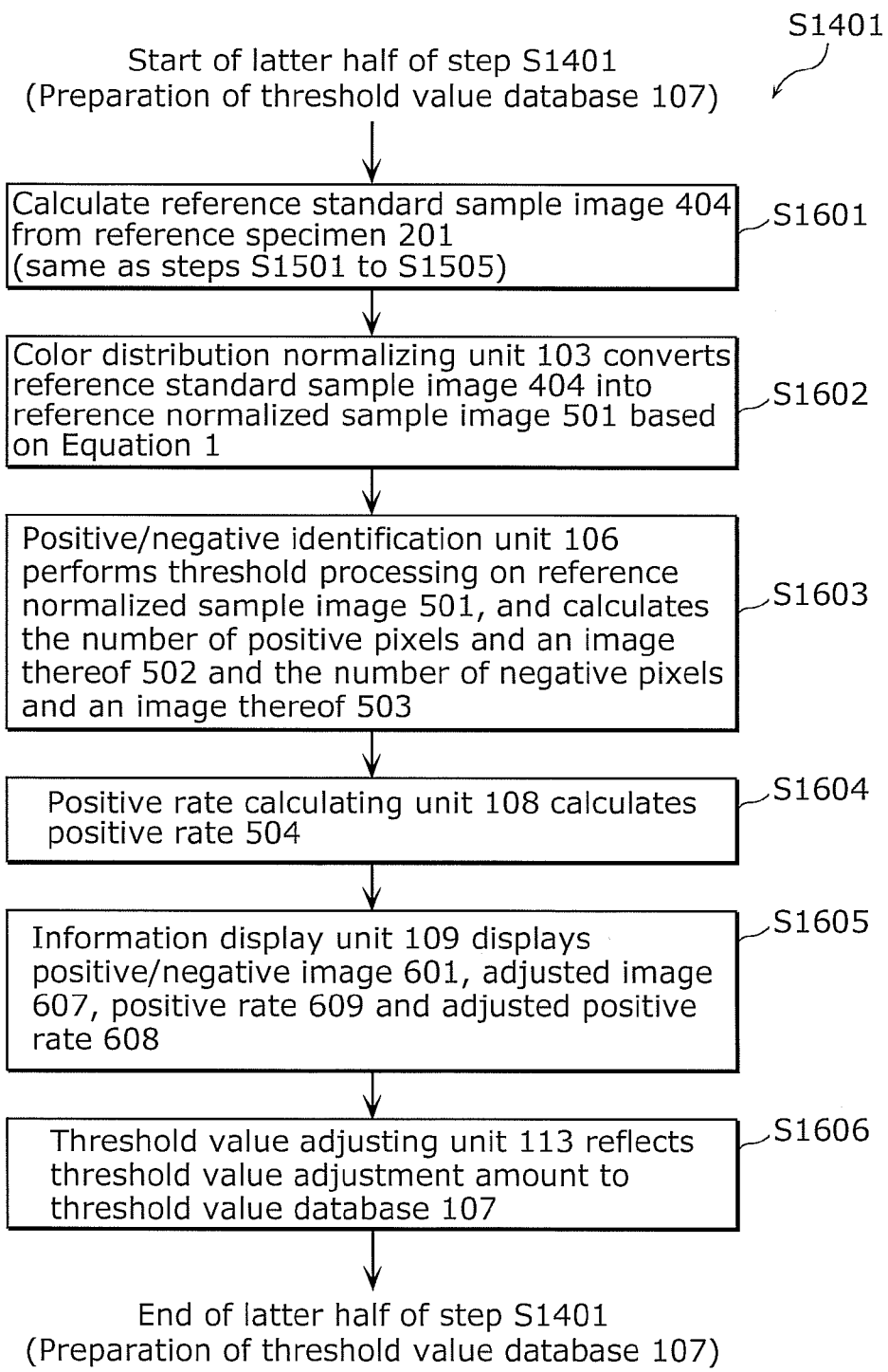
FIG. 15 is a flowchart illustrating processing for preparing the threshold value database.

FIG. 15 is a flowchart illustrating processing for preparing the threshold value database 107 (the latter half of S1401 shown in FIG. 13).

In step S1601, a reference standard sample image 404 is calculated from the reference specimen 201. The processing in this step is the same as the processing from step S1501 to step S1505 shown in FIG. 14, and thus a description thereof is omitted here.

In step S1602, the color distribution normalizing unit 103 converts the reference standard sample image 404 into a reference normalized sample image 501 according to Equation 1 by using the standard color distribution vector Cs 209 provided by the normalized information database 104.

In step S1603, the positive/negative identification unit 106 performs threshold processing on the pixel value of each pixel in the reference normalized sample image 501 by using the threshold values provided by the threshold value database 107, and calculates the number of positive pixels and an image thereof 502, and the number of negative pixels and an image thereof 503.

In step S1604, the positive rate calculating unit 108 calculates a positive rate 504 from the number of positive pixels and the number of negative pixels.

In step S1605, the information display unit 109 displays the number of positive pixels and the image thereof 502, the number of negative pixels and the image thereof 503 on the screen as the positive/negative image 601, the adjusted image 607, the positive rate 609, and the adjusted positive rate 608 shown in FIG. 9 so as to present them to the threshold value setting person 505.

In step S1606, the threshold value adjusting unit 113 reflects a threshold value adjustment amount that has been designated by the user via the adjustment menu 604, the retouch cursor 605 or the retouch menu 606 to the threshold value database 107.

Through the processing from step S1601 to step S1606 described above, the preparation of the threshold value database 107 ends.

Step S1401 shown in FIG. 13 ends upon completion of the preparation of the normalized information database 104 shown in FIG. 14 and the preparation of the threshold value database 107 shown in FIG. 15.

Returning to FIG. 13, in step S1402, a standard sample color distribution vector C 303 is prepared. The standard sample color distribution vector C 303 represents a color histogram calculated from all the pixels in the standard sample image 111, as described with reference to FIG. 4. Accordingly, the standard color space converting unit 102 converts the sample image 110 into a standard sample image 111. Also, the color distribution normalizing unit 103 calculates the standard sample color distribution vector C 303 from the standard sample image 111. Note that the operation required to calculate the standard sample color distribution vector C 303 performed by the sample preparing unit 1002, the test information input unit 114 and the image acquiring unit 101 is the same as that from step S1501 to step S1503 shown in FIG. 14.

In step S1403, the color distribution normalizing unit 103 converts the standard sample image 111 into a normalized sample image 112 based on Equation 1. That is, the color distribution normalizing unit 103 converts each pixel value in the standard sample image 111 such that the color distribution vector C (the standard sample color distribution vector C 303) of the standard sample image 111 matches the standard color distribution vector Cs 209. The color distribution normalizing unit 103 acquires the standard color distribution vector Cs 209 from the normalized information database 104 in accordance with a test information instruction from the control unit 105.

In step S1404, through processing performed by the positive/negative identification unit 106 and the positive rate calculating unit 108, the number of positive pixels and an image thereof 502, the number of negative pixels and an image thereof 503 and a positive rate 504 are acquired from the normalized sample image 112. The information display unit 109 displays the acquired results as the positive/negative image 601, the positive rate 609 and the like as shown in FIG. 9. The details of the operation are the same as those from step S1603 to step S1605 shown in FIG. 15, and thus a description thereof is omitted here.

Through the processing from step S1401 to step S1404 described above, the image measurement apparatus 100 ends the calculation of the positive rate of the specimen 1001 and the image presentation.

According to the present embodiment, the color differences caused due to differences in sample preparation are absorbed by color conversion into the standard color space. That is, the sample image is converted into a standard sample image in the standard color space. It is thereby possible to convert the sample image into an image having common color information that is not dependent on the characteristics of the image acquiring unit. Also, the color distribution normalizing unit converts the pixel value of each pixel in the standard sample image such that the color distribution vector of the standard sample image matches the standard color distribution vector. In other words, the color distribution normalizing unit converts the pixel value of each pixel in the standard sample image such that the sample color distribution vector matches the standard color distribution vector. Accordingly, the variations in color distribution of the samples can be absorbed, and a normalized sample image that is not dependent on the sample preparation method can be produced. By acquiring a positive rate from the normalized sample image, it is possible to acquire the positive rate that is not dependent on the characteristics of the image acquiring unit and is not dependent on the differences in sample preparation. In other words, it is possible to identify a specific object of interest by using fixed threshold values without being affected by the color variations due to sample preparation. Also, by presenting quantitative information obtained by image measurement to a physician or a technician, objective evidence can be given to diagnostic criterion. As a specific case, in PTL 1, the pixels defining an object of interest, the pixels defining a normal cell and the pixels defining the background area of a biological specimen image are identified by differences in color distribution. The object of interest is, for example, as written in Non-Patent Literature (NPL) 1, a positive nucleus in the HER2 (human EGFR (Epidermal Growth Factor Receptor)-related 2) test. According to the IHC (Immunohistochemistry) method, a HER2 protein positive stain image is observed, the proportion of positive nuclei in the entire cell nuclei, or in other words, a positive cell rate is required. There are a large amount of cell nucleus in a single image, and thus if they are counted by visual inspection by a pathologist, the test time will be long, which affects the accuracy of the test. Accordingly, computerized image processing is advantageous in terms of both efficiency and accuracy, and thus is effective in assistance in pathological diagnostics.

[NPL 1] HER2 Test Guide, Third Edition, page 9, September 2009

Also, when a positive pixel or a negative pixel is designated to be added on the sample image displayed on the screen, the threshold value adjusting unit changes the threshold value range such that the designated positive pixel or negative pixel is identified. When a positive pixel or a negative pixel is designated to be removed, the threshold value adjusting unit changes the threshold value range such that the designated positive pixel or negative pixel is not identified. That is, when a positive pixel or a negative pixel is designated to be added or removed on the sample image displayed on the screen, in response thereto, the threshold value is changed. Accordingly, the threshold value setting person can change the threshold value range with a simple method.

Embodiment 2

In the present embodiment, a description will be given of an image measurement apparatus that can absorb color differences caused due to differences in sample preparation through color conversion, and can calculate a positive rate by using a fixed threshold value database. The present embodiment is different from Embodiment 1 in that the normalization processing performed by the color distribution normalizing unit is different.

Figure 16:
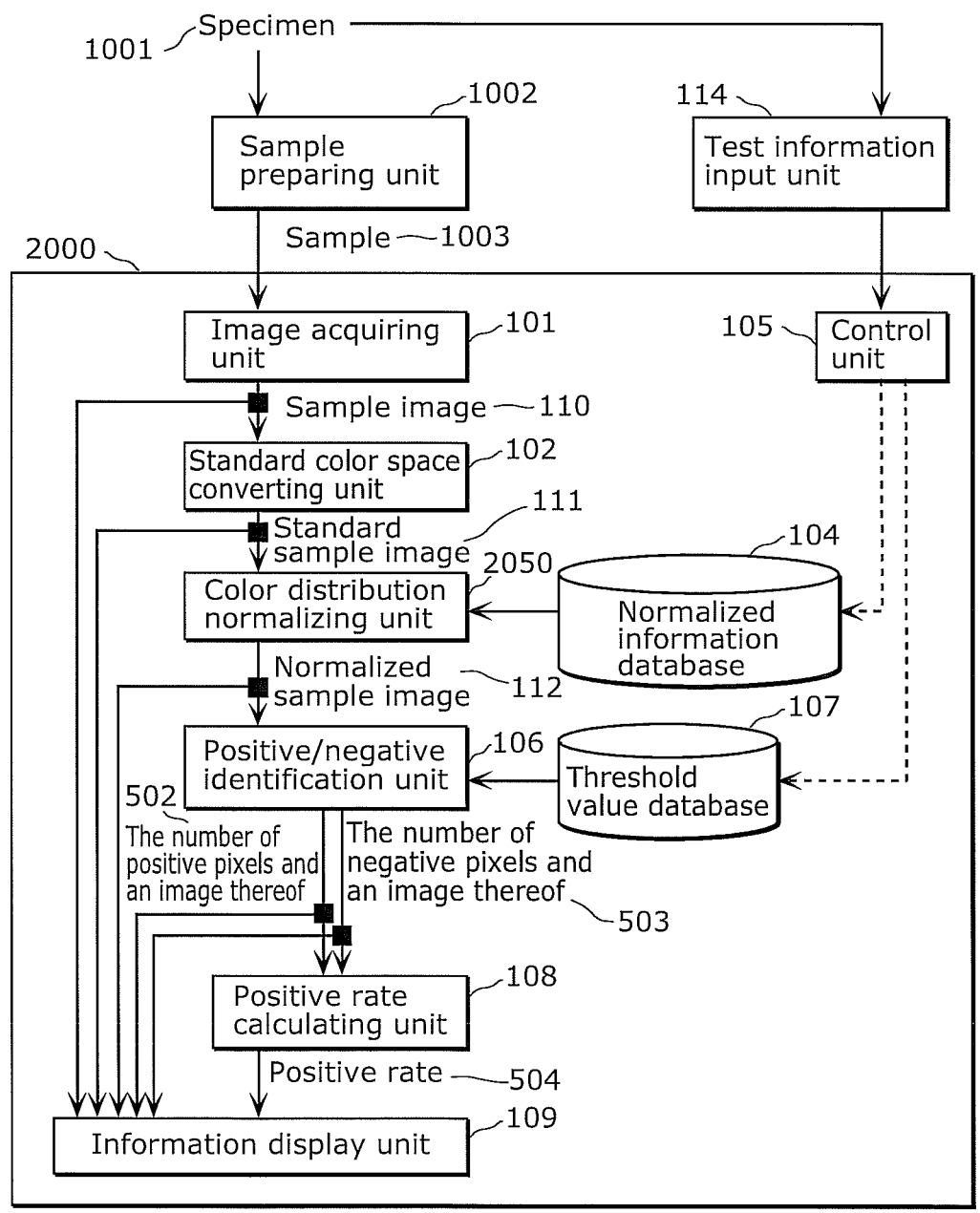
FIG. 16 is a block diagram showing a configuration of an image measurement apparatus according to Embodiment 2.

FIG. 16 is a block diagram showing a configuration of an image measurement apparatus according to Embodiment 2 of the present disclosure. The components that are similar to those of FIG. 1 are given the same reference numerals, and a description thereof is omitted here. Unlike the image measurement apparatus 100 of Embodiment 1, an image measurement apparatus 2000 includes a color distribution normalizing unit 2050 in place of the color distribution normalizing unit 193.

In order to absorb the variations in color distribution of samples, the color distribution normalizing unit 2050 performs normalization processing on a standard sample image 111 so as to convert the standard sample image 111 into a normalized sample image 112.

Specifically, the color distribution normalizing unit 2050 converts the standard sample image 111 into the normalized sample image 112 by converting the pixel values of the pixels in the standard sample image such that a mean vector of vectors indicating the color in the standard color space of each pixel included in the standard sample image 111 matches a predetermined standard color distribution vector indicating a standard color distribution in the standard color space.

A description will be given of normalization processing for absorbing variations in sample distribution.

Figure 17:
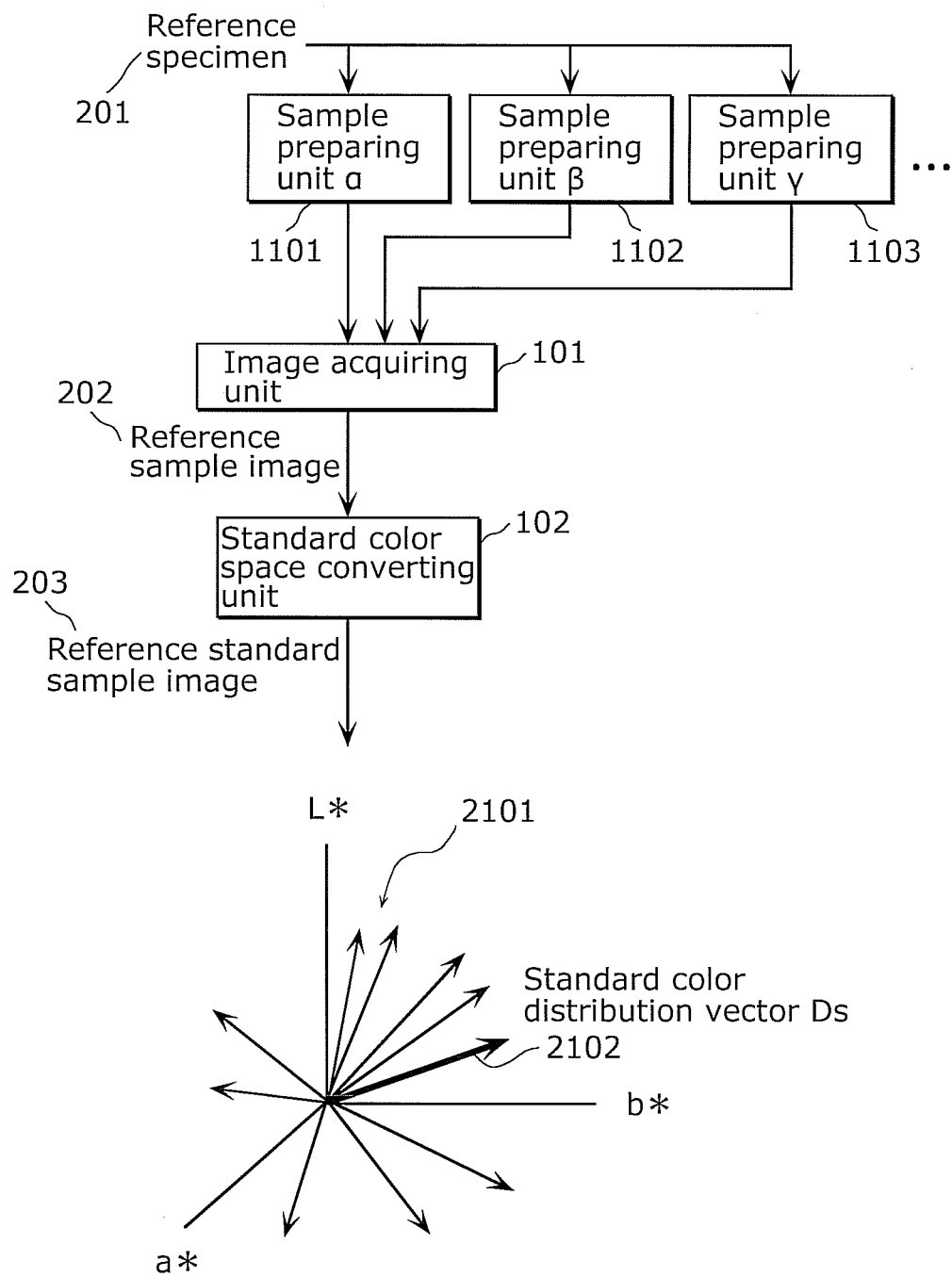
FIG. 17 is a diagram showing an example of calculation of a standard color distribution vector Ds.

FIG. 17 is a diagram illustrating a method for calculating the standard color distribution vector indicating a standard color distribution. In order to know the variations in the sample distribution, as shown in FIG. 17, a plurality of sample preparing units (a sample preparing unit α 1101, a sample preparing unit β 1102, a sample preparing unit γ 1103, . . . ) prepare samples from a single reference specimen 201. The image acquiring unit 101 acquires a plurality of reference sample images 202 by capturing an image of each prepared sample. As the differences in the sample preparing units, variations in the sample preparation process, differences in the sample preparation facility and the like are conceived, as described with reference to FIG. 3.

As in Embodiment 1, the standard color space converting unit 102 converts each reference sample image 202 into a reference standard sample image 203 that is an image in the standard color space. Through this, a plurality of samples having different characteristics are acquired as reference standard sample images 203. The reference standard sample images 203 have L*a*b* values (L* value, a* value, and b* value) for each pixel. The standard color space converting unit 102 plots, for each pixel in each reference standard sample image 203, the L*a*b* values as a three-dimensional vector in a standard color space 2101. Specifically, the same number of three-dimensional vectors as the number of pixels are plotted from each reference standard sample image 203 into the standard color space 2101. The color distribution normalizing unit 2050 determines the mean vector of the three-dimensional vectors representing the L*a*b* values plotted in the standard color space 2101, and defines it as a standard color distribution vector Ds 2102. The standard color distribution vector Ds 2102 corresponds to the centroid of a color distribution of a plurality of images (reference standard sample images 203), and represents the entire color tone of the plurality of images. Specifically, the standard color distribution vector Ds 2102 indicates color information of a plurality of images such as that there are more reddish images or that there are more light images, instead of representing an individual color such as a stained positive nucleus or negative nucleus, or the background color. Absorbing color variations of samples means to make the color tone, brightness and the like of the entire image uniform, and corresponds to normalization of the standard sample image 111 into the color tone or brightness indicated by the standard color distribution vector Ds 2102.

The method for calculating the standard color distribution vector Ds 2102 is not limited thereto. It may be possible to, for example, calculate the standard color distribution vector Ds 2102 from the L*a*b* values of white having a color temperature of 6500 K that is one of the standard light sources, or calculate the standard color distribution vector Ds 2102 from the L*a*b* values of white displayed on the screen of the information display unit 109. Alternatively, the standard color distribution vector Ds 2102 may be calculated based on the diagnostic guidelines formulated by medical experts, or the like. Furthermore, in order to make a comparison with historical cases, a standard color distribution vector Ds 2102 representing a color distribution of the historical cases may be provided.

Figure 18:
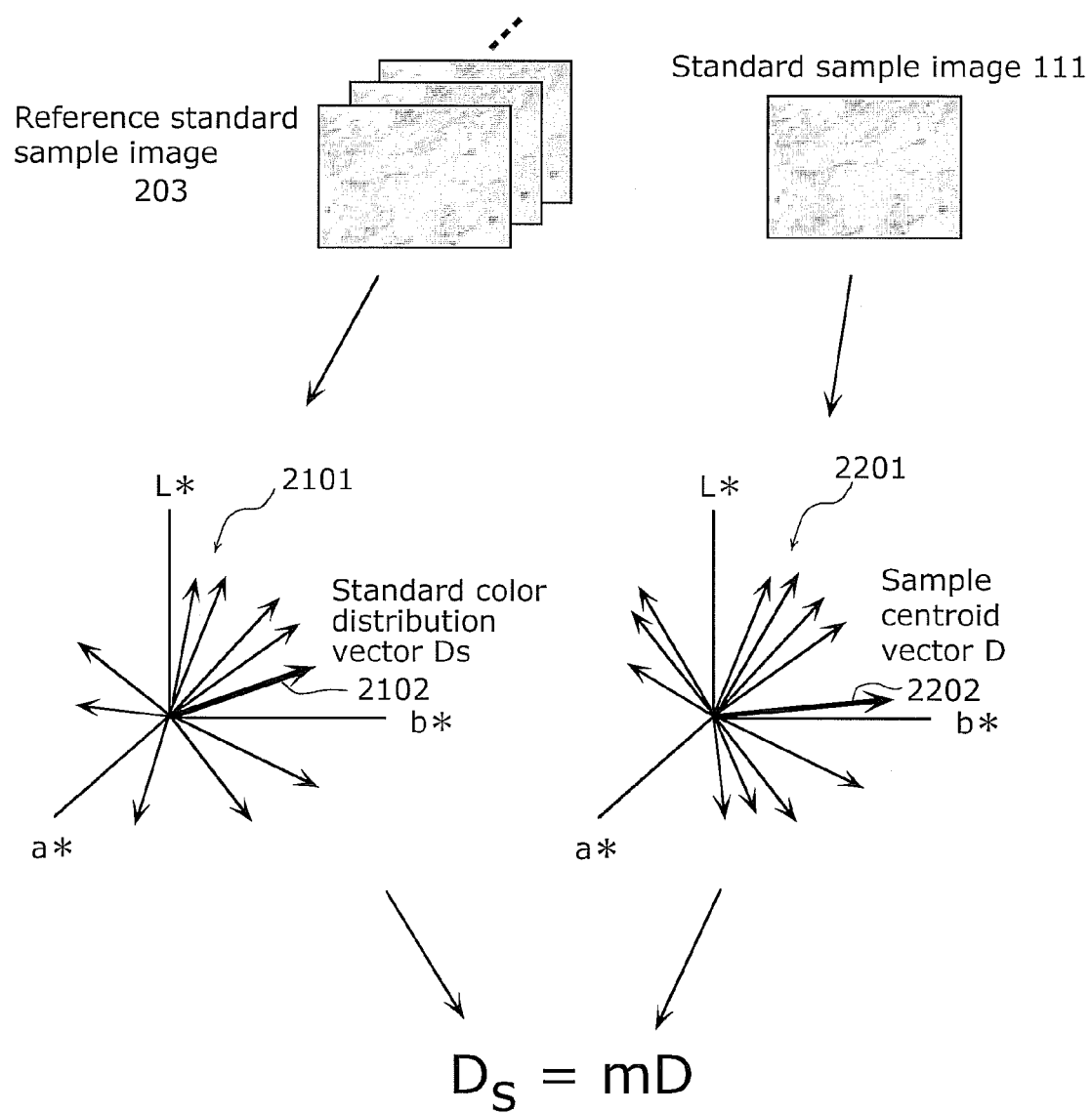
FIG. 18 is a diagram showing an example of a method for calculating a matrix m.

The color distribution normalizing unit 2050 plots the L*a*b values of each pixel in the standard sample image 111 as a three-dimensional vector in a standard color space 2201 as shown in FIG. 18. The same number of three-dimensional vectors representing L*a*b* values as the number of pixels in the standard sample image 111 is plotted, and the color distribution normalizing unit 2050 calculates the mean vector thereof as a sample centroid vector D 2202. The sample centroid vector D 2202 means the centroid of a color distribution of the standard sample image 111, and thus represents the color tone or brightness of the entire image.

The color distribution normalizing unit 2050 normalizes the colors of the standard sample image 111 by converting the pixel values of the pixels in the standard sample image 111 such that the sample centroid vector D 2202 matches the standard color distribution vector Ds 2102. The conversion of the sample centroid vector D 2202 into the standard color distribution vector Ds 2102 can be expressed by Equation 4. A matrix m for converting the sample centroid vector D 2202 into the standard color distribution vector Ds 2102 is calculated by Equation 5.

[Math. 3]

$$D_S = mD \qquad \text{(Equation 4)}$$

$$m = DD_S^{-1} \qquad \text{(Equation 5)}$$

Note that, however, the method for calculating the matrix in is merely exemplary, and thus the matrix in may be calculated by any other method. For example, a matrix a is calculated by the following method as the matrix m. As shown in Equation 6, a 3×P pixel average standard color matrix Gs calculated from a plurality of reference standard sample images and a 3×P sample color matrix G consisting of L*a*b* values of each pixel in the standard sample image 111 are related by a matrix a, whereby the matrix a is calculated by Equation 7,

[Math. 4]

$$\begin{bmatrix} L_1^* & L_2^* & \dots & L_P^* \\ a_1^* & a_2^* & \dots & a_P^* \\ b_1^* & b_2^* & \dots & b_P^* \end{bmatrix}_S = a \begin{bmatrix} L_1^* & L_2^* & \dots & L_P^* \\ a_1^* & a_2^* & \dots & a_P^* \\ b_1^* & b_2^* & \dots & b_P^* \end{bmatrix} \qquad \text{(Equation 6)}$$

$$\Leftrightarrow G_s = aG$$

$$a = GG_S^{-1} \qquad \text{(Equation 7)}$$

Figure 19:
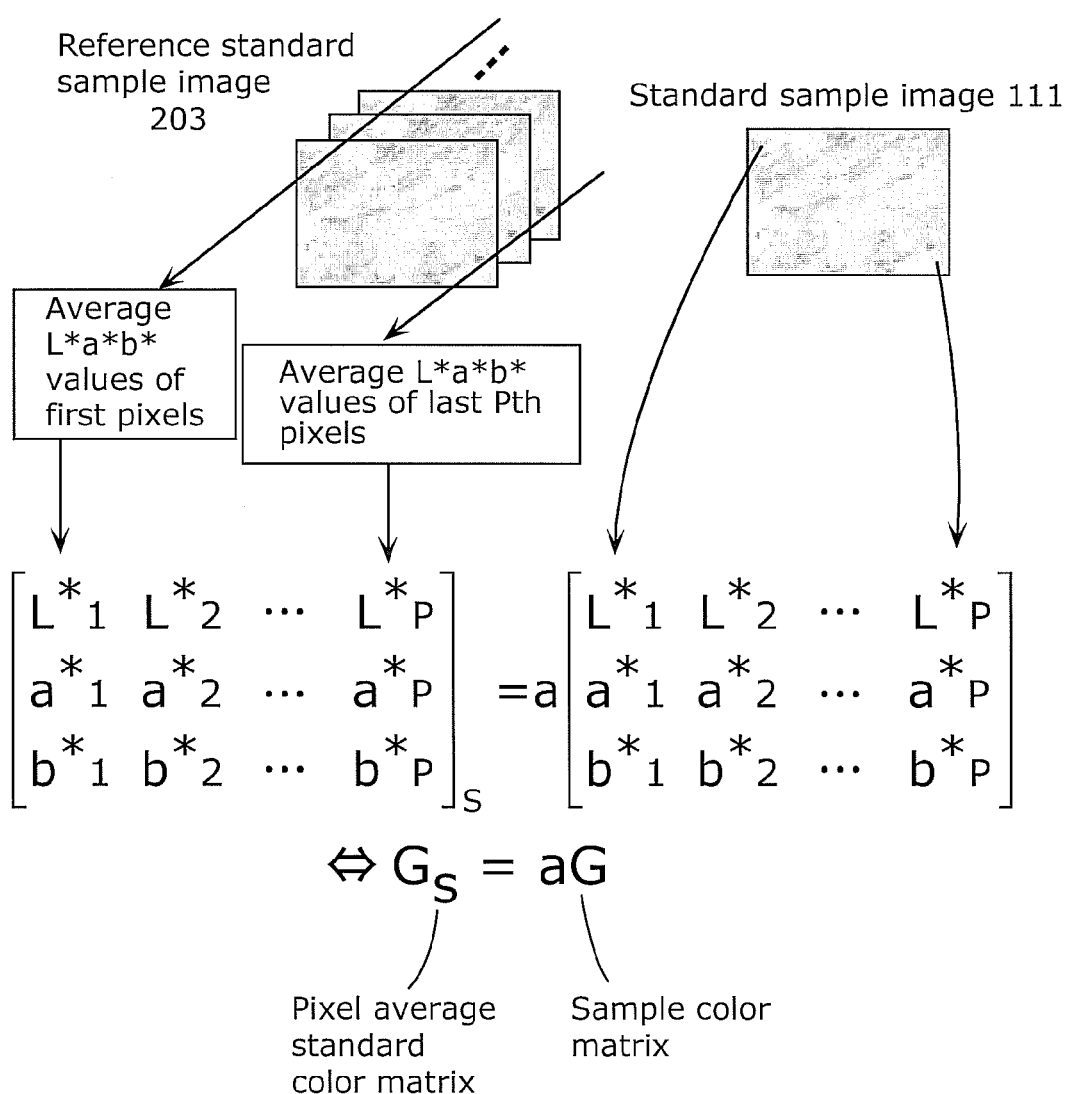

In the above equations, P indicating the number of rows in the pixel average standard color matrix Gs and the sample color matrix G matches the number of pixels in the standard sample image 111. Specifically, the sample color matrix G is a matrix in which the L*a*b* values of each pixel are arranged in the row direction. In order for the pixel average standard color matrix Gs to have P rows (where P is the number of rows), for example, as shown in FIG. 19, a plurality of reference standard sample images 203 are averaged on a pixel-by-pixel basis, and the resulting averaged L*a*b* values are arranged in the row direction.

In this way, the color distribution normalizing unit 2050 converts the standard sample image 111 into the normalized sample image 112 according to Equation 4 or Equation 6. The matrix m required by Equation 4 is calculated by Equation 5, and the matrix a required by Equation 6 is calculated by Equation 7. The standard color distribution vector Ds 2102 required to calculate Equation 5 or the pixel average standard color matrix Gs required to calculate Equation 7 are provided from the normalized information database 104. That is, the color distribution normalizing unit 2050 converts each pixel value in the standard sample image 111 such that the sample centroid vector D 2202 calculated from the standard sample image 111 matches the standard color distribution vector Ds 2102. For example, the color distribution normalizing unit 2050 converts, for each pixel in the standard sample image 111, the pixel value by multiplying, the L*a*b* of the pixel by the matrix m.

Embodiment 2 also produces the same effects as Embodiment 1.

The color distribution normalizing unit according to Embodiment 2 converts the pixel value of each pixel in the standard sample image such that the mean vector of vectors indicating the color in the standard color space of each pixel included in the standard sample image matches the standard color distribution vector. Accordingly, the variations in color distribution of the samples can be absorbed, and a normalized sample image that is not dependent on the sample preparation method can be produced.

Embodiment 3

In the present embodiment, a description will be given of an image measurement apparatus that can absorb color differences caused due to differences in sample preparation through color conversion, and can calculate a positive rate that indicates the proportion of positive pixels by using a fixed threshold value database. In particular, a standard sample image that is not dependent on the characteristics of the image acquiring unit 101 is calculated by correcting a sample image.

Figure 20:
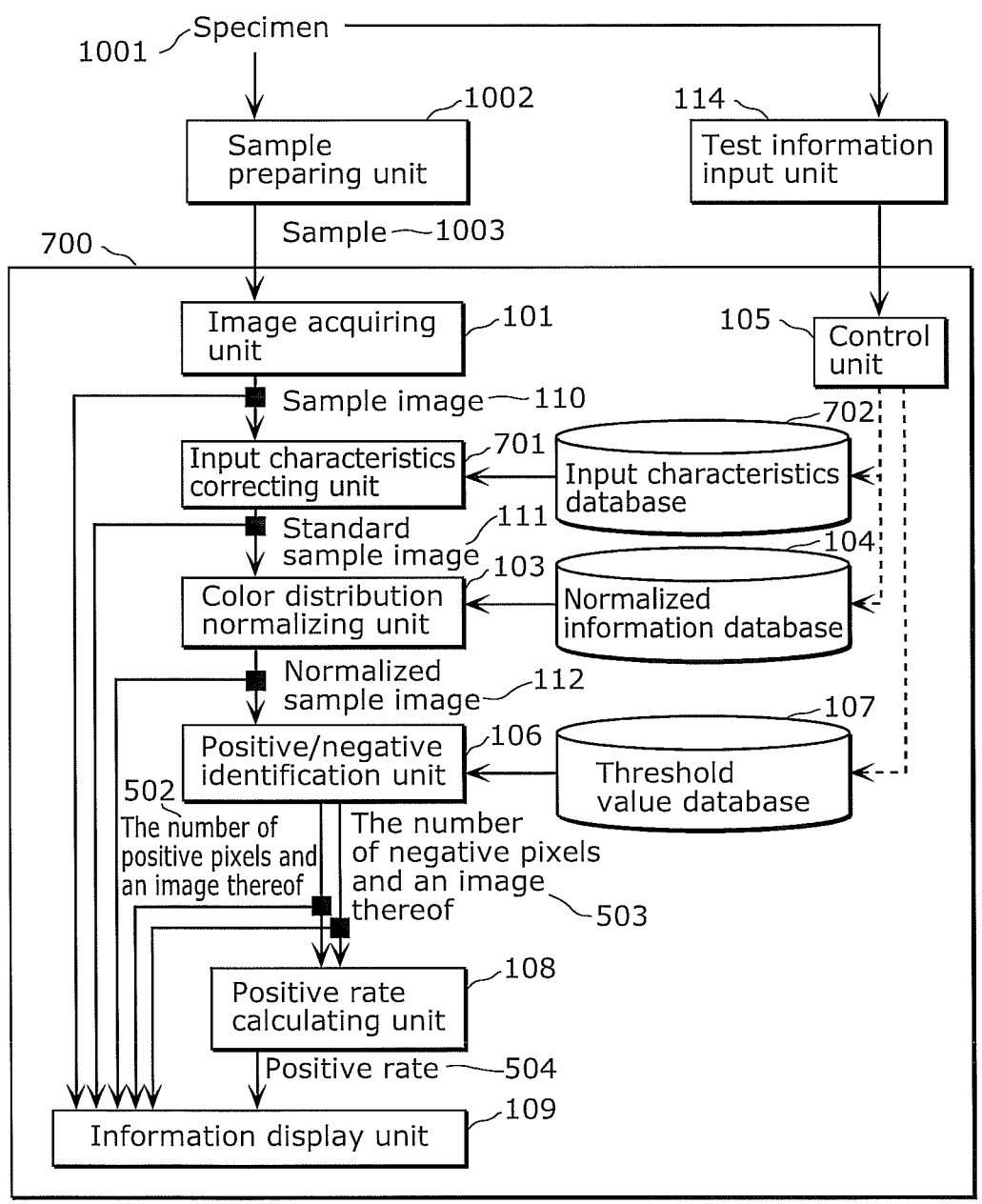
FIG. 20 is a block diagram showing an image measurement apparatus according to Embodiment 3.

FIG. 20 is a block diagram showing a configuration of an image measurement apparatus according to Embodiment 3 of the present disclosure. The components that are similar to those of FIG. 1 are given the same reference numerals, and a description thereof is omitted here.

An input characteristics correcting unit 701 generates a standard sample image 111 from a sample image 110 such that the differences in characteristics of the image acquiring unit 101 are absorbed and combined together.

FIG. 21 shows an example of the input/output characteristics of the image acquiring unit 101. Input is a spectral distribution of light, or in other words, color information. It is assumed here that the image acquiring unit 101 includes a scanner. As a result of illuminating a sample with a light source of the scanner, the light that has passed through the sample exhibits a spectral distribution according to the optical absorption characteristics by the stain of the sample. In FIG. 21, as an example of the color information, XYZ tri-stimulus values are used. Output is a digital signal output by a photoelectric conversion element of the scanner, namely, RGB pixel values. In the example of FIG. 21, data from number 1 to number 29 represent input/output characteristics regarding a gray scale, and thus the RGB pixel values are substantially the same values. Data from number 30 to number 59 represent input/output characteristics regarding an R gradation, and thus the R pixel value increases as the number increases. Data from number 60 to number 89 represent input/output characteristics regarding a G gradation, and thus the G pixel value increases as the number increases. Data from number 90 to number 119 represent input/output characteristics regarding a B gradation, and thus the B pixel value increases as the number increases.

In the case where the image acquiring unit 101 has different characteristics, even when the input XYZ tri-stimulus values are the same, the output RGB pixel values are different. Meanwhile, when the sample preparing unit 1002 has different characteristics, in FIG. 21, the input color information differs. The input characteristics correcting unit 701 has the function of absorbing the differences in characteristics of the image acquiring unit 101. And, the color distribution normalizing unit 103 has the function of absorbing the differences in characteristics of the sample preparing unit 1002.

Figure 22:
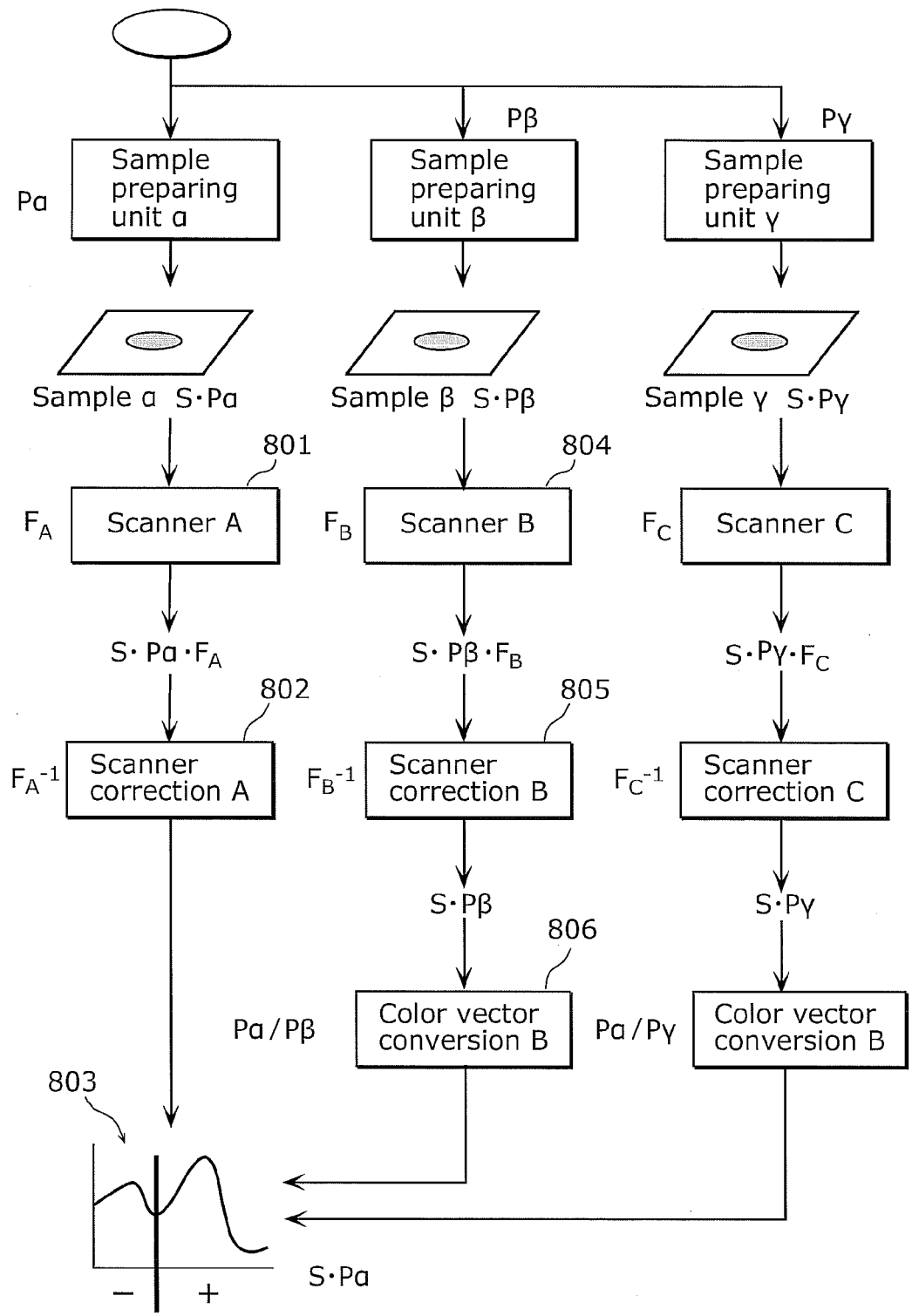
FIG. 22 is a diagram illustrating the principals of operation of an input characteristics correcting unit.

FIG. 22 shows principals of operation of the input characteristics correcting unit 701 and the color distribution normalizing unit 103.

It is assumed here that there are a plurality of sample preparing units 1002, namely, sample preparing units α to γ, and the sample preparing units a to γ respectively have characteristics Pα to Pγ. It is also assumed that there are a plurality of image acquiring units 101, namely, scanners A to C, and the scanners A to C respectively have input/output characteristics $F_A$ to $F_C$. An example of the input/output characteristics is as shown in FIG. 21.

The input characteristics correcting unit 701 absorbs the differences in input/output characteristics of the scanners. Specifically, the scanner A 801 has input/output characteristics $F_A$. Accordingly, the input characteristics correcting unit 701 performs processing to give inverse input/output characteristics $F_A^{-1}$ (scanner correction A 802) to the output of the scanner A 801. That is, the input characteristics correcting unit 701 converts RGB pixel values into XYZ tri-stimulus values by using the input/output characteristics table shown in FIG. 21. Through the processing described above, a color histogram 803 having S·Pα is obtained with respect to the sample α.

The scanner B 804 has input/output characteristics $F_B$. Accordingly, the input characteristics correcting unit 701 performs processing to give inverse input/output characteristics $F_B^{-1}$ (scanner correction B 805) to the output of the scanner B 804. A standard sample image 111 having characteristics S·Pβ is thereby obtained from the sample β. Furthermore, the color distribution normalizing unit 103 calculates a color histogram of the sample β by performing the same processing as in Embodiment 1 on the standard sample image 111 having characteristics S·Pβ. That is, the color distribution normalizing unit 103 performs a color vector conversion B 806 having characteristics Pα/Pβ on the standard sample image 111 having characteristics S·Pβ. The characteristics Pβ of the sample preparing unit β are canceled out, and in turn a color histogram having characteristics S·Pα is calculated from the sample β. This color histogram has characteristics that are the same as those of the color histogram calculated from the sample α. The same processing is also performed on the sample γ prepared by the sample preparing unit γ, and a color histogram having characteristics S·Pα is calculated.

In FIG. 21, the scanner input/output characteristics indicate conversion characteristics from color information into digital signals. Accordingly, inverse input/output characteristics correspond to conversion characteristics from digital signals into color information. Based on this idea, the scanner correction B 805 is performed by finding RGB pixel values closest to S·Pβ·$F_B$ (sample image 110) that are digital signals in the table shown in FIG. 21, and taking XYZ tri-stimulus values corresponding to the RGB pixel values from the table. Through this, inverse input/output characteristics are given. This is a so-called "reverse lookup of the table". It is also possible to derive a relational equation between color information and digital signals from the information shown in FIG. 21, and express the input/output characteristics by using a calculation equation. In this case, inverse input/output characteristics can be obtained by inverse conversion of the calculation equation.

An input characteristics database 702 stores therein the correspondence relationship between color information and digital signals described with reference to FIG. 21. To be specific, the input characteristics database 702 stores therein lookup tables and calculation equations.

In the present embodiment, the standard sample image 111 is an image represented by XYZ tri-stimulus values. Accordingly, in the XYZ space, processing by the color distribution normalizing unit 103 and the positive/negative identification unit 106 is performed. The color space is different from that of Embodiment 1, but the processing is the same. Accordingly, a detailed description thereof is not given here.

As described above, according to the present embodiment, a correction having characteristics inverse of the characteristics obtained in the image capturing by the image acquiring unit is performed on the sample image. It is thereby possible to convert the sample image into an image having common color information that is not dependent on the characteristics of the image acquiring unit. Also, the color distribution normalizing unit converts the pixel value of each pixel in the standard sample image such that the color distribution vector of the standard sample image matches the standard color distribution vector. Accordingly, the variations in color distribution of the samples can be absorbed, and a normalized sample image that is not dependent on the sample preparation method can be produced. By acquiring a positive rate from the normalized sample image, it is possible to acquire the positive rate that is not dependent on the characteristics of the image acquiring unit and is not dependent on the differences in sample preparation. In other words, it is possible to identify a specific object of interest by using fixed threshold values without being affected by the color variations due to sample preparation.

Accordingly, the positive rate can be calculated by converting color differences caused by differences in the preparation of samples into the colors of a sample prepared by a given sample preparing unit and using a fixed threshold value database. Also, by presenting quantitative information obtained by image measurement to a physician or a technician, objective evidence can be given to diagnostic criterion.

The above has been described assuming that the color distribution normalizing unit 103 performs the same processing as in Embodiment 1, but the color distribution normalizing unit 103 may perform the same processing as in Embodiment 2.

Embodiment 4

In the present embodiment, a description will be given of an image measurement apparatus that can absorb color differences caused due to differences in sample preparation through color conversion, and can calculate a positive rate by using a fixed threshold value database. In particular, a configuration in which operation is performed in a server client system will be described.

Figure 23:
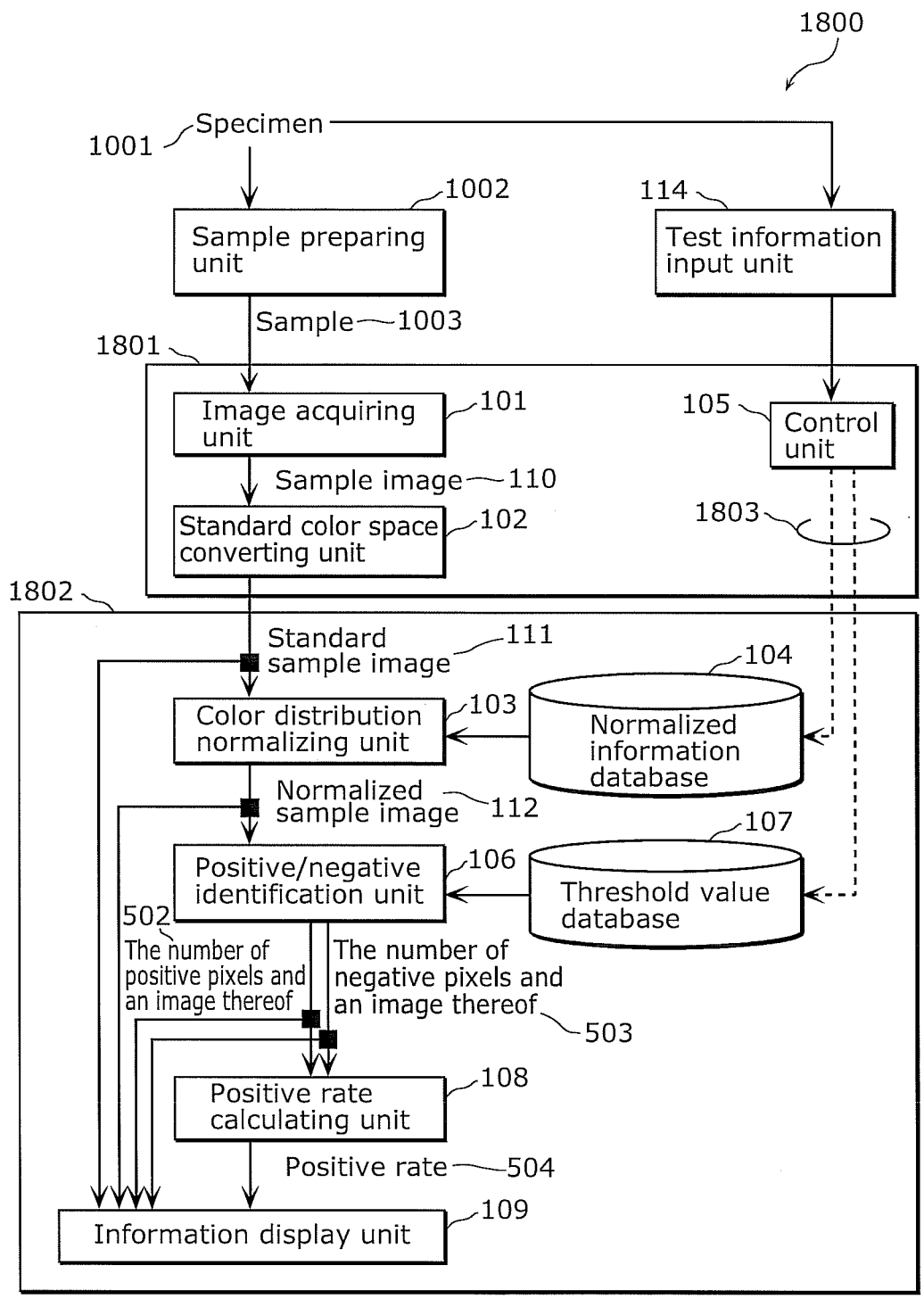
FIG. 23 is a block diagram showing a configuration of an image measurement server client system according to Embodiment 4.

FIG. 23 is a block diagram showing a configuration of an image measurement server client system according to Embodiment 4 of the present disclosure. The components that are similar to those of FIG. 1 are given the same reference numerals, and a description thereof is omitted here.

An image measurement server client system 1800 includes a sample preparing unit 1002, a test information input unit 114, and an image measurement client 1801 and an image measurement server 1802 that are connected to each other via a network. The image measurement client 1801 can be, for example, a computer installed in a proprietary hospital, and the image measurement server 1802 can be a computer installed in a major hospital.

The image measurement client 1801 includes an image acquiring unit 101, a standard color space converting unit 102, and a control unit 105.

The image measurement server 1802 includes a color distribution normalizing unit 103, a normalized information database 104, a positive/negative identification unit 106, a threshold value database 107, a positive rate calculating unit 108, and an information display unit 109.

The image measurement client 1801 transmits a standard sample image 111 generated by the standard color space converting unit 102 and a control signal 1803 output by the control unit 105 to the image measurement server 1802. When a standard color space (for example, CIEL*a*b*, etc) has been set in advance in the image measurement client 1801 and the image measurement server 1802, transmission and reception of the standard sample image 111 is enabled. For example, the control signal 1803 may be embedded in a header portion of the standard sample image 111. By doing so, the image measurement client 1801 transmits the standard sample image 111 in which the control signal 1803 is embedded to the image measurement server 1802, and the image measurement server 1802 takes out the control signal 1803 from the received standard sample image 111.

The normalized information database 104 and the threshold value database 107 may be configured as a database server independent of the image measurement server 1802. Also, the image acquiring unit 101 and the information display unit 109 may be located in a location different from that of the image measurement client 1801 and the image measurement server 1802.

As described above, according to the present embodiment, even when sample preparation and pathological diagnostics are performed at remote locations, objective information obtained by image measurement can be presented to a physician or a technician, and thus objective evidence can be given to diagnostic criterion. In particular, it is sufficient that the image measurement client 1801 performs processing until the sample image 110 is represented in the standard color space. Accordingly, by collectively operating a plurality of image measurement clients 1801 installed in minor hospitals, rural hospitals or the like by using an image measurement server 1802 installed in a major hospital where a pathologist works, cooperation among hospitals and cooperation with local medical institutions can be achieved.

Embodiment 5 in the present embodiment, a description will be given of an image measurement apparatus that can absorb color differences caused due to differences in sample preparation through color conversion, and can calculate a positive rate by using a fixed threshold value database. In particular, a configuration in which operation is performed in a server client system will be described.

Figure 24:
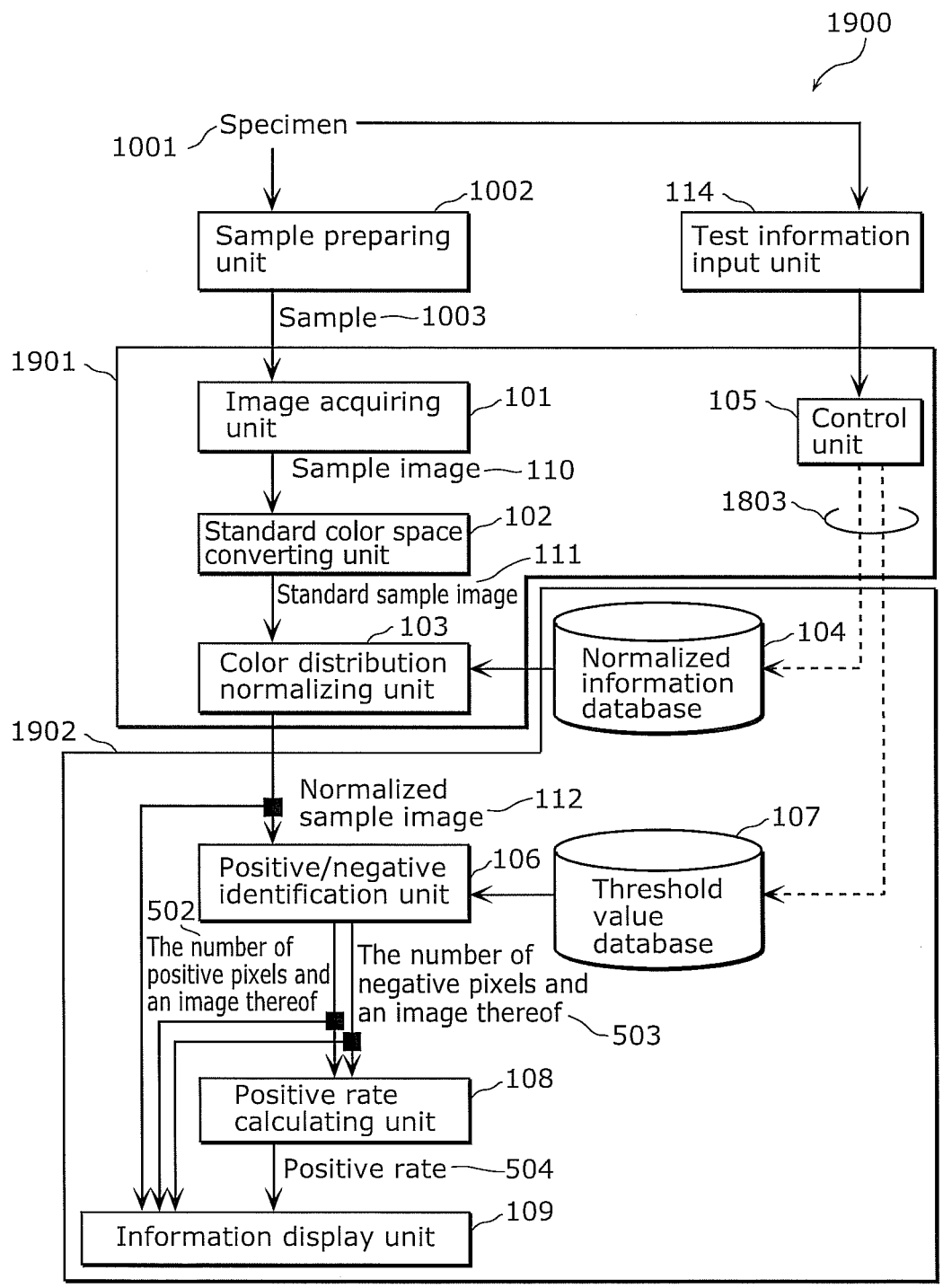
FIG. 24 is a block diagram showing a configuration of an image measurement server client system according to Embodiment 5.

FIG. 24 is a block diagram showing a configuration of an image measurement server client system according to Embodiment 5 of the present disclosure. The components that are similar to those of FIG. 1 are given the same reference numerals, and a description thereof is omitted here.

An image measurement server client system 1900 includes a sample preparing unit 1002, a test information input unit 114, and an image measurement client 1901 and an image measurement server 1902 that are connected to each other via a network. The image measurement client 1901 can be, for example, a computer installed in an affiliate of a major hospital, and the image measurement server 1902 can be a computer installed in the major hospital.

The image measurement client 1901 transmits a normalized sample image 112 generated by the color distribution normalizing unit 103 and a control signal 1803 output by the control unit 105 to the image measurement server 1902. The color distribution normalizing unit 103 needs to acquire a standard color distribution vector Cs 209 from the normalized information database 104 of the image measurement server 1902 in order to compute Equation 1. Accordingly, upon receiving the control signal 1803, the image measurement server 1902 transmits a standard color distribution vector Cs 209 corresponding to the control signal to the image measurement client 1901.

The normalized information database 104 and the threshold value database 107 may be configured as a database server independent of the image measurement server 1902. Also, the image acquiring unit 101 and the information display unit 109 may be located in a location different from that of the image measurement client 1901 and the image measurement server 1902.

As described above, according to the present embodiment, even when sample preparation and pathological diagnostics are performed at remote locations, objective information obtained by image measurement can be presented to a physician or a technician, and thus objective evidence can be given to diagnostic criterion. In particular, it is sufficient that the image measurement client 1901 performs processing until the normalized sample image 112 is generated. Accordingly, by collectively operating a plurality of image measurement clients 1901 installed in minor hospitals, rural hospitals or the like by using an image measurement server 1902 installed in a major hospital where a pathologist works, cooperation among hospitals and cooperation with local medical institutions can be achieved.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image measurement apparatus according to each of the embodiments is a program described below.

The program causes a computer to execute: acquiring a sample image that is an image obtained by capturing an image of a sample; converting the sample image into a standard sample image that is an image in a standard color space; converting the standard sample image into a normalized sample image by converting pixel values of pixels in the standard sample image to cause a color distribution vector indicating a color distribution of the standard sample image to match a predetermined standard color distribution vector indicating a standard color distribution; and detecting positive pixels by performing threshold processing on pixel values of pixels in the normalized sample image, and acquire a positive rate indicating a proportion of the detected positive pixels.

One or more exemplary embodiments disclosed herein are applicable to an image measurement apparatus or the like that measures the positive rate of a sample by processing an image obtained by capturing an image of the sample.

The herein disclosed subject matter is to be considered descriptive and illustrative only, and the appended Claims are of a scope intended to cover and encompass not only the particular embodiment(s) disclosed, but also equivalent structures, methods, and/or uses.

The invention claimed is:

1. An image measurement apparatus comprising:
   an image acquiring unit configured to acquire a sample image that is an image obtained by capturing an image of a sample;
   a standard color space converting unit configured to convert the sample image into a standard sample image that is an image in a standard color space;
   a color distribution normalizing unit configured to convert the standard sample image into a normalized sample image by converting pixel values of pixels in the standard sample image to cause a color distribution vector indicating a color distribution of the standard sample image to match a standard color distribution vector indicating a standard color distribution and predetermined based on a plurality of reference standard sample images; and
   a positive rate acquiring unit configured to detect positive pixels by performing threshold processing on pixel values of pixels in the normalized sample image, and acquire a positive rate indicating a proportion of the detected positive pixels,
   wherein the plurality of reference standard sample images are images in the standard color space of a plurality of reference sample images obtained by capturing images of a plurality of samples prepared from the same reference specimen by using a plurality of sample preparation methods having different characteristics.

2. The image measurement apparatus according to claim 1, wherein the color distribution normalizing unit is configured to convert the standard sample image into the normalized sample image by converting the pixel values of the pixels in the standard sample image to cause a standard sample color distribution vector to match the standard color distribution vector, the standard sample color distribution vector representing the color distribution vector and being a vector indicating a color frequency distribution in the standard color space of the plurality of pixels included in the standard sample image, and the standard color distribution vector representing the standard color distribution and indicating a standard color frequency distribution.

3. The image measurement apparatus according to claim 2, wherein the standard color distribution vector is a mean vector of vectors representing the color frequency distribution that are obtained from each of the plurality of reference standard sample images.

4. The image measurement apparatus according to claim 1, wherein the color distribution normalizing unit is configured to convert the standard sample image into the normalized sample image by converting the pixel values of the pixels in the standard sample image to cause the color distribution vector to match the standard color distribution vector, the color distribution vector being a mean vector of vectors indicating a color in the standard color space of each pixel included in the standard sample image, and the standard color distribution vector indicating the standard color distribution in the standard color space.

5. The image measurement apparatus according to claim 4, wherein the standard color distribution vector is a mean vector of vectors indicating a color in the standard color space of each pixel included in each of the plurality of reference standard sample images.

6. The image measurement apparatus according to claim 1, wherein the positive rate is a ratio of the number of positive pixels to a sum of the number of positive pixels and the number of negative pixels.

7. The image measurement apparatus according to claim 6, wherein the positive rate acquiring unit includes:
a positive/negative identification unit configured to identify, from the normalized sample image, a pixel having a pixel value falling within a first threshold value range as a positive pixel and a pixel having a pixel value falling within a second threshold value range as a negative pixel; and
a positive rate calculating unit configured to calculate a ratio of the number of positive pixels to a sum of the number of positive pixels and the number of negative pixels as the positive rate.

8. The image measurement apparatus according to claim 7, further comprising
a threshold value adjusting unit configured to:
when a positive pixel is designated to be added on the sample image displayed on a screen, change the first threshold value range to cause the designated positive pixel to be identified; and
when a positive pixel is designated to be removed on the sample image displayed on the screen, change the first threshold value range to cause the designated positive pixel to not be identified.

9. The image measurement apparatus according to claim 8, wherein the threshold value adjusting unit is further configured to:
when a negative pixel is designated to be added on the sample image displayed on the screen, change the second threshold value range to cause the designated negative pixel to be identified; and
when a negative pixel is designated to be removed on the sample image displayed on the screen, change the second threshold value range to cause the designated negative pixel to not be identified.

10. The image measurement apparatus according to claim 1,
wherein the standard color space is a Commission Internationale de l'Eclairage (CIE) uniform color space or an sRGB space.

11. An image measurement system comprising:
an image measurement client; and
an image measurement server,
wherein the image measurement client includes:
an image acquiring unit configured to acquire a sample image that is an image obtained by capturing an image of a sample; and
a standard color space converting unit configured to convert the sample image into a standard sample image that is an image in a standard color space, and
the image measurement server includes:
a color distribution normalizing unit configured to convert the standard sample image into a normalized sample image by converting pixel values of pixels in the standard sample image to cause a color distribution vector indicating a color distribution of the standard sample image to match a standard color distribution vector indicating a standard color distribution and predetermined based on a plurality of reference standard sample images; and
a positive rate acquiring unit configured to detect positive pixels by performing threshold processing on pixel values of pixels in the normalized sample image, and acquire a positive rate indicating a proportion of the detected positive pixels,
wherein the plurality of reference standard sample images are images in the standard color space of a plurality of reference sample images obtained by capturing images of a plurality of samples prepared from the same reference specimen by using a plurality of sample preparation methods having different characteristics.

12. An image measurement system comprising:
an image measurement client; and
an image measurement server,
wherein the image measurement client includes:
an image acquiring unit configured to acquire a sample image that is an image obtained by capturing an image of a sample;
a standard color space converting unit configured to convert the sample image into a standard sample image that is an image in a standard color space; and
a color distribution normalizing unit configured to convert the standard sample image into a normalized sample image by converting pixel values of pixels in the standard sample image to cause a color distribution vector indicating a color distribution of the standard sample image to match a standard color distribution vector indicating a standard color distribution and predetermined based on a plurality of reference standard sample images, and
the image measurement server includes
a positive rate acquiring unit configured to detect positive pixels by performing threshold processing on pixel values of pixels in the normalized sample image, and acquire a positive rate indicating a proportion of the detected positive pixels,
wherein the plurality of reference standard sample images are images in the standard color space of a plurality of reference sample images obtained by capturing images of a plurality of samples prepared from the same reference specimen by using a plurality of sample preparation methods having different characteristics.

13. An image measurement method comprising:
acquiring a sample image that is an image obtained by capturing an image of a sample;
converting the sample image into a standard sample image that is an image in a standard color space;
converting the standard sample image into a normalized sample image by converting pixel values of pixels in the standard sample image to cause a color distribution vector indicating a color distribution of the standard sample image to match a standard color distribution vector indicating a standard color distribution and predetermined based on a plurality of reference standard sample images; and
detecting positive pixels by performing threshold processing on pixel values of pixels in the normalized sample image, and acquiring a positive rate indicating a proportion of the detected positive pixels,
wherein the plurality of reference standard sample images are images in the standard color space of a plurality of reference sample images obtained by capturing images of a plurality of samples prepared from the same reference specimen by using a plurality of sample preparation methods having different characteristics.

14. A non-transitory computer-readable recording medium for use in a computer, the recording medium having a computer program recorded thereon for causing the computer to execute the image measurement method according to claim 13.

* * * * *